(12) United States Patent
Criswell et al.

(10) Patent No.: US 10,608,476 B2
(45) Date of Patent: Mar. 31, 2020

(54) SYSTEM AND METHOD FOR WIRELESS ELECTRICITY DISTRIBUTION

(71) Applicant: David R. Criswell, Houston, TX (US)

(72) Inventors: David R. Criswell, Houston, TX (US); Anatoliy Boryssenko, Belchertown, MA (US); Olena Boryssenko, Belchertown, MA (US)

(73) Assignee: David R. Criswell, Houston, TX (US)

( * ) Notice: Subject to any disclaimer, the term of this patent is extended or adjusted under 35 U.S.C. 154(b) by 75 days.

(21) Appl. No.: 16/041,219

(22) Filed: Jul. 20, 2018

(65) Prior Publication Data

US 2018/0358845 A1 Dec. 13, 2018

Related U.S. Application Data

(63) Continuation-in-part of application No. 15/868,870, filed on Jan. 11, 2018, now abandoned.

(60) Provisional application No. 62/445,499, filed on Jan. 12, 2017.

(51) Int. Cl.
| | |
|---|---|
| *H01Q 19/02* | (2006.01) |
| *H02J 50/20* | (2016.01) |
| *H02J 50/40* | (2016.01) |
| *H02J 50/80* | (2016.01) |
| *H01Q 13/02* | (2006.01) |
| *H01Q 15/00* | (2006.01) |
| *H01Q 21/00* | (2006.01) |
| *H01Q 1/24* | (2006.01) |
| *H01J 25/50* | (2006.01) |

(52) U.S. Cl.
CPC ............. *H02J 50/40* (2016.02); *H01Q 1/248* (2013.01); *H01Q 13/0241* (2013.01); *H01Q 15/0066* (2013.01); *H01Q 19/023* (2013.01); *H01Q 21/0025* (2013.01); *H02J 50/80* (2016.02); *H01J 25/50* (2013.01); *H02J 50/20* (2016.02)

(58) Field of Classification Search
USPC ........................................................ 307/104
See application file for complete search history.

(56) References Cited

U.S. PATENT DOCUMENTS

2012/0153744 A1* 6/2012 Criswell ................. H02J 50/23
307/104

* cited by examiner

*Primary Examiner* — Rexford N Barnie
*Assistant Examiner* — Xuan Ly
(74) *Attorney, Agent, or Firm* — Gordon Rees Scully Mansukhani LLP; David R. Heckadon

(57) ABSTRACT

A Wireless Electricity Distribution System (WEDS) and method is provided in the present invention. The apparatus includes a transmitter that transmits a microwave radiation beam towards a receiver. The transmitter includes a source of electricity, an electricity to microwave converter and a reflectarray antenna having a emitter horn and reflect aperture. The receiver includes a rectenna antenna providing a power conditioner. Alternatives include multiple beam transmitters, modular construction, intermediate relay redirectors, and simultaneous data over power transmissions.

17 Claims, 35 Drawing Sheets

SYSTEM AND METHOD FOR WIRELESS ELECTRICITY DISTRIBUTION

RELATED APPLICATIONS

The present application is a Continuation-In-Part of U.S. patent application Ser. No. 15/868,870 filed Jan. 11, 2018, which claims the benefit of U.S. Provisional Application No. 62/445,499 filed Jan. 12, 2017, both of which are incorporated herein by reference in their entirety for all purposes.

TECHNICAL FIELD

This invention relates to the directed and focused wireless transmission of electricity to one or more destination over a wide range of distances and power strengths. Alternative embodiments include relay redirectors for extended range and simultaneous data over power transmission for simultaneous information transfer.

DESCRIPTION OF RELATED ART

This invention relates to the distribution of electricity facilitated through the transmission of electromagnetic (EM) radiation, more specifically, to the wireless transmission and remote reception of microwave power. Society demands electricity. The infrastructure to provide electricity includes a source of energy, electricity generators that convert the energy source into electricity, and transmission structures for moving the electricity from the generators to distant user locations. Since Edison this transmission was generally facilitated through electrical power lines.

Electrical power lines, a form of a long extension cord, exhibit favorable and unfavorable features. Specifically the power lines are generally conductive cables which suffer losses from the cable's inherent resistance and degradation. In addition such power lines require substantial equipment and land. The power lines often require legal rights-of-way and governmental approvals from those jurisdictions over which the power lines pass. In addition any interruption they experience affects the entire dedicated electrical pathways. These power lines are also exposed to injury, destruction and sabotage. Power lines are also a subject of environmental catastrophes like hurricanes and wild fires. Such power lines are time consuming and costly to install and to maintain. Power lines that are directed to remote locations, like mountain tops and islands, are, by their very nature, complicated and, in some circumstance, simply impossible to implement.

These complications can be overcome by employing wireless power transmission. Wireless power transmission uses electromagnetic radiation in the form of microwave radiation as the medium that carries the energy from one location to another. Importantly, these systems have been limited by a limited operating range, lack of directivity and focus, limited distance capabilities, aperture size of the transmit and receiving antenna, single destination receiver and single destination transmitter.

The Wireless Electricity Distribution System (WEDS) of this invention offers directed and focused microwave transmission, multiple destination distribution, improved range for relay operation, variable operational range capability, and simultaneous data transmission with the power transmission. Better than the conventional power line structure, WEDS offers greatly reduced equipment and land demands. Complications related to rights-of-way and governmental approvals are substantially reduced. Instillations and maintenance requirements are greatly reduced. Power interruptions can be rerouted rapidly and emergency power distribution to areas where power is lost can be provided rapidly. In addition there is essentially no limitation due to complicated destinations.

WEDS is characterized by the near, intermediate and far distance capabilities and by the low, medium and high power requirements. The exact details of component size may very based upon the exact range and power requirements but the basic architecture of WEDS remains constant. While the physical mechanism of microwave propagation are commonly known WEDS overcomes the limits on range, limited power strength, single transmission structure, relay range limitations, directivity and focus limitations, and lack of simultaneous date transfer.

Fundamentally WEDS includes a transmitter and a receiver of microwave radiation. An alternative embodiment includes a multiple-radiation beam transmitter and a multi-radiation beam receiver and a relay redirector receiver/transmitter.

(i) The transmitter includes 1) a source of electricity and power allocator for the one or more transmitted microwave radiation beams, 2) one or more electricity to microwave converter, 3) respective microwave power controllers, 4) a reflectarray antenna including a) one or more circular polarized radiating horn each with a waveguide section and a cone section and b) a reflectarray antenna aperture having one or more transmit sub-array modules with each transmit sub-array module having one or more rotatable septum (sometimes reflector) cell modules, where each reflector cell has a rotatable perpendicular septum mounted to a horizontal back plane for controlling the direction and focus of the transmitted microwave radiation.

(ii) The receiver includes 1) a receiving rectenna antenna aperture for receiving the microwave radiation beams from one or more transmitters, the rectenna antenna including one or more receiving sub-array modules with each receiving sub-array module having one or more receiver cells where each receiving cell has microwave receiving circuitry that includes a) a microwave radiation capturer, b) an input matching circuit, c) microwave to DC electricity rectifier, d) a low pass filter, and e) electricity collection control circuitry, and 2) an electrical power conditioner for providing electrical power to an external electrical load.

(iii) An alternative redirector embodiment includes 1) a relay redirector having a redirector receiving system, structured as the receiver above, for receiving microwave radiation form one or more remote transmitters, 2) an allocation and distribution controller for directing the proper amount of received electrical power to the proper relay redirector transmitter and 3) one or more relay redirector transmitters, structured as the transmitter above, with each transmitter transmitting to each destination its allocated portion of the received electrical power.

(iv) An alternative data over power embodiment includes 1) one or more data/power transmitters, structured as the transmitter above, where such data/power transmitter includes a) a data source, and b) modulator electronics that combines the data with the microwave radiation, and 2) data/power receivers, structured as the receiver above, where such data/power receiver includes a) demodulator that separates the data from the microwave radiation and b) data storage.

Wireless power transmission between two distance points requires efficient management of the various system losses and system limitations. Employing a general architecture for the transmitter and the receiver, both of which employ array antenna architectures is a foundation of the WEDS. Phased array patch antenna circular polarization, vertical and horizontal linear polarization, frequency, aperture size, transmission distance, power strength are all variations that can be accommodated, optimized, and exploited by WEDS. The present invention, WEDS, provides a new, novel and non-obvious structure for overcoming the problems and short comings inherent in the prior art.

SUMMARY

WEDS is an electricity distribution system. The system includes a transmitter and a receiver. WEDS covers a wide range of transmission distances and transmission power strengths to distribute the proper amount of electricity form one or more source locations to one or more distance user locations. The underlying objective of WEDS is to move energy to locations where it is needed and to overcome the complications of moving the energy source itself, such as coal, oil or natural gas and of having to rely on long distance power lines all of which is accomplished by broadcasting weightless microwave radiation directly, or through relays, form source to the destination.

A preferred embodiment of WEDS distributes from one or more fixed source locations to one or more fixed destination locations a predetermined amount of electricity for each destination. In another embodiment the structure of WEDS distributes a preselected range of power to meet the respective destination's power requirements.

WEDS includes a transmitter at the source location and a receiver at the destination location. The transmitter converts electricity into microwaves and transmits the microwaves to the receiver. At the destination the receiver receives the transmitted microwaves and converts the received microwaves back into electricity. In the preferred embodiment the transmitter includes 1) a source of electricity and power allocator for the one or more transmitted microwave radiation beams, 2) one or more electricity to microwave converter, 3) respective microwave power controllers, 4) a reflectarray antenna including a) one or more circular polarized radiating horn with a waveguide section and a cone section and b) a reflect array antenna aperture having one or more transmit sub-array modules with each transmit sub-array module having one or more rotatable reflector cells, where each reflector cell has a rotatable perpendicular septum mounted to a horizontal back plane for controlling the direction and focus of the transmitted microwave radiation. The receiver includes 1) a receiving rectenna antenna aperture for receiving microwave radiation beams from one or more transmitters, the rectenna aperture including one or more receiving sub-array modules with each receiving sub-array module having one or more receiving cells where each receiving cell has microwave receiving circuitry that includes a) a microwave radiation capturer, b) an input matching circuit, c) microwave to electricity rectifier, d) a low pass filter electricity and e) collection connectivity, and 2) an electrical power conditioner for powering an external electrical load.

An alternative redirector embodiment includes 1) a relay redirector having a redirector receiving system, structured as the receiver above, for receiving microwave radiation form one or more remote transmitter, 2) an allocation and distribution controller for directing the proper amount of received power to the proper relay redirector transmitter and 3) one or more relay redirector transmitters, structured as the transmitter above, with each transmitter transmitting to each destination its allocated portion of the received electrical power. An alternative data over power embodiment includes 1) one or more data/power transmitters, structured as the transmitter above, where such data/power transmitter includes a) a source of data, and b) a modulator that combines the data with the microwave radiation, and c) data/power receivers, structured as the receiver above, where such data/power receiver includes a) separating demodulator that separates the data from the microwave radiation and b) data storage.

WEDS transmitter requires a source of energy such as an electrical source or some basic energy source like coal, natural gas or oil that is conveyed into electricity. In the preferred embodiment electricity is converted into a continuous microwave signal by, for example, a 2.45 GHz magnetron. Alternative devices to generate the microwave signal include solid-state microwave signal generators, semiconductor amplifier, or the like. Other convenient microwave frequencies include 900 MHz or 5.6 GHz. Essentially all microwave radiation frequencies are workable but current governmental permitting, and available circuit components and equipment indicate 2.45 GHz is the current optimum frequency selection. The microwave signal is transmitted by coaxial cabling and connectors to the waveguide section of a radiating horn. The waveguide section includes an internal centrally positioned stepped down septum to generate circular polarized (CP) radiation. The microwave signal is introduced to the wave guide through a coaxial probe located perpendicular to the septum approximately ¼ wavelength from the closed end. The wave guide section is coupled to the cone section. The wave guide and cone can have a square, circular or other enclosed cross section. The horn generate CP microwave radiation which is directed towards and illuminates the array of transmit septum cells of the transmit sub-array modules of the reflector aperture. Each cell includes a back plane and perpendicular rotatable septum which together reflects the horn's microwave radiation. The rotatable septum is rotated to specific angular orientations to generate the directed superpositioned beam with controlled direction and focus to the preselected distance destination. Preferably each transmit cell is about ½ wavelength square which, for 1-4×4 (16 transmit cells) sub-array module results in one 2 wavelength square transmit sub-array module. The reflect aperture is made up of an array of transmit sub-array modules shaped into a representation of a square, rectangular, circular, elliptical or other shape footprint. As an example, the size of a 5×5 square array of transmit sub-array of modules of 4×4 square array of septum cell (20×20 septum cells) totaling approximately 10 wavelengths square. The preferred size of the reflector aperture is determined by the near field determination for the given microwave frequency and feed horn, the effective diameter of the receiving rectenna aperture antenna and the distance between the transmitter and the receiver. The reflector aperture and the radiating horn are rigidly mounted to maintain their respective orientation. The rigid mount includes a gimbaled connection to a platform or base. The rotatable reflect cell modules are mounted in a sub-frame which sub-frames are mounted into a transmit sub-array module frame which are mounted into a reflect aperture frame.

The WEDS receiver includes a receiving rectenna antenna aperture of one or more receiving sub-array receiving modules of one or more receiver cells. The receiving sub-array module includes, for example, a square array of 4×4 receiver cells. Typically, for example, the rectenna antenna aperture includes a square array of 5×5 receiving sub-array modules. The configuration of the receiving sub-array modules in the receiving rectenna antenna aperture is square, rectangular, circular, elliptical or other footprint. The preferred size of the receiving rectenna antenna aperture is determined by the near field determination for the given microwave frequency, the effective diameter of the reflector aperture and the distance between the transmitter and the receiver. The receiving rectenna antenna aperture is gimbal mounted to a mechanical stand or base. Each of the receiver cells receives a portion of the incoming microwave radiation with the received microwave signal being rectified into a receive cell electrical output. The receive cell electrical output from each receiver cell is connected by series and/or parallel connectivity to provide the antenna output electricity. The antenna output electricity is provided to a power conditioner to convert the antenna output electricity to the required DC or AC electricity with attendant current and voltage and a power factor to match the user load.

These and other aspects of the invention will be better appreciated and understood when considered in conjunction with the following description and accompanying drawings. It should be understood, however, that the following description, while indications of the preferred embodiment and its variations and details are given by way of illustration and not limitation. Many changes and modifications may be made within the scope of the embodiment herein without departing from the spirit thereof including the various embodiments and details and examples.

DETAILED DESCRIPTION OF THE PREFERRED EMBODIMENTS

Figure 1A:
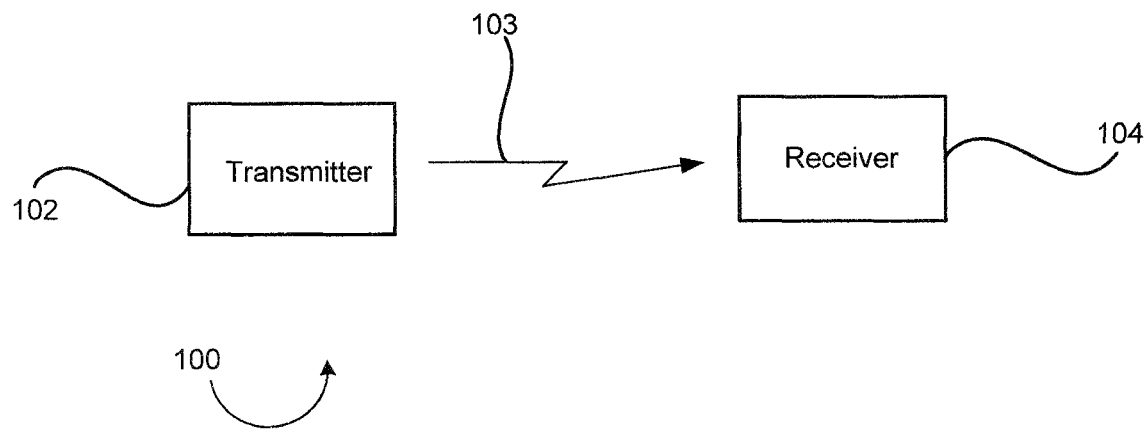
FIG. 1A is a diagrammatic representation of the wireless electricity distribution system (WEDS) according to one embodiment of the invention.

The embodiments described herein and the various features and details thereof are explained more fully with reference to the non-limiting embodiments that are illustrated in the accompanying drawings and detailed in the following description. Descriptions of well-known components and processing techniques are omitted so as to not unnecessarily obscure the inventive embodiments herein. The examples used herein are intended to facilitate an understanding of ways in which the embodiments may be practiced and to further enable those of skill in the art to practice these embodiments. Accordingly, the examples should not be construed as limiting the scope of the invention. In referring to the drawings, similar references correspond to similar structures and features throughout the figures.

As mentioned, there remains a need for wireless power transmission over large distances. The embodiments herein achieve this by providing a wireless electricity distribution system.

FIG. 1A is a diagrammatic representation of the wireless electricity distribution system (WEDS) 100 according to one embodiment of this invention. The WEDS 100 includes a transmitter 102 and a receiver 104. A transmit antenna (not shown) transmits electromagnetic (EM) radiation 103 towards the receiver 104. The transmitter 102 includes a source of electricity (not shown) and a converter of electricity into an EM signal (not shown). The EM signal is transmitted as EM radiation 103 by transmit antenna (not shown). The receiver 104 receives the EM radiation 103 by receive antenna (not shown). The receiver 104 includes a rectifier of EM radiation 103 into electricity (not shown) and a conditioner (not shown) to condition the electricity for user AC or DC applications. The transmitter 102 and receiver 104 are modular and form a wireless link for transmitting electricity from an origin location to a destination location without transmission lines.

Figure 1B:
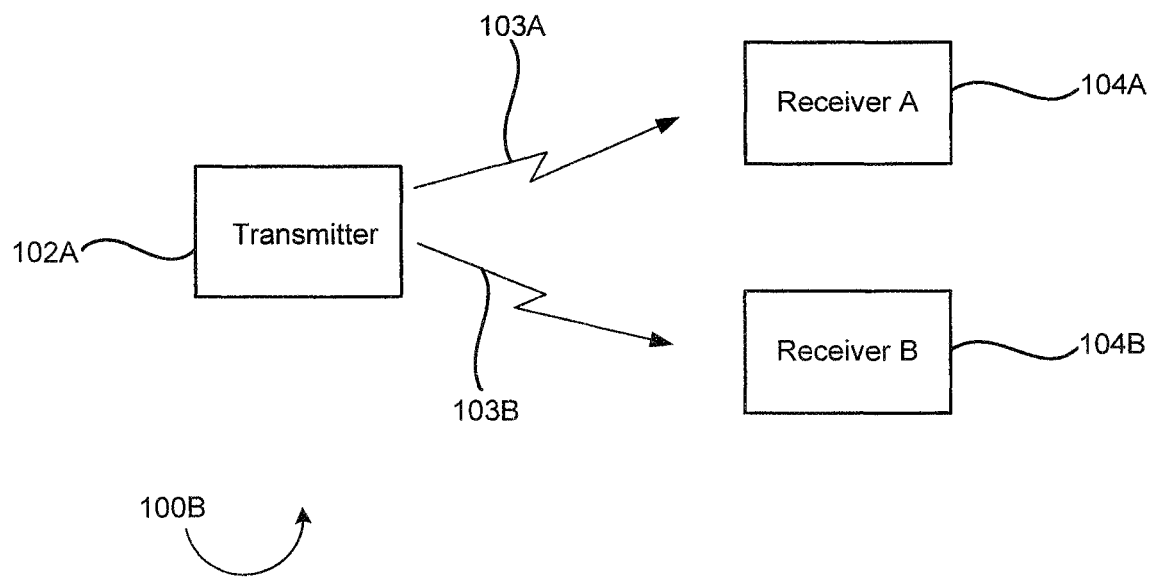
FIG. 1B is a diagrammatic representation of an alternative embodiment of WEDS for a multiple transmission by a single transmitter to multiple receivers.

FIG. 1B is a diagrammatic representation of the WEDS according to an alternative embodiment of the invention. The WEDS of this embodiment 100B includes a transmitter 102A, and two or more receiver 104A and 104B. The transmitter 102A includes multiple transmission antennas (not shown) capable of transmitting EM radiation 103A and 103B, towards respective receivers 104A and 104B. The transmitter 102A includes transmit antenna (not shown), a source of electricity (not shown) and one or more converter (not shown) to generate corresponding EM signals (not shown). The transmit antenna independently transmits the two or more separate and independent EM radiations beams 103A and 103B toward respective receiver 104A and 104B. Each receiver 104A and 104B receives the respective EM radiation 103A and 103B by receiving antenna (not shown). The respective receiver 104A and 104B include rectifiers (not shown) that convert the respective EM radiation into respective AC or DC electricity which is respectively accumulated and then conditioned for user applications. The WEDS 100B forms a wireless link for transmitting electricity form a single origin location to two separate and independent destination locations without transmission lines.

Figure 1C:
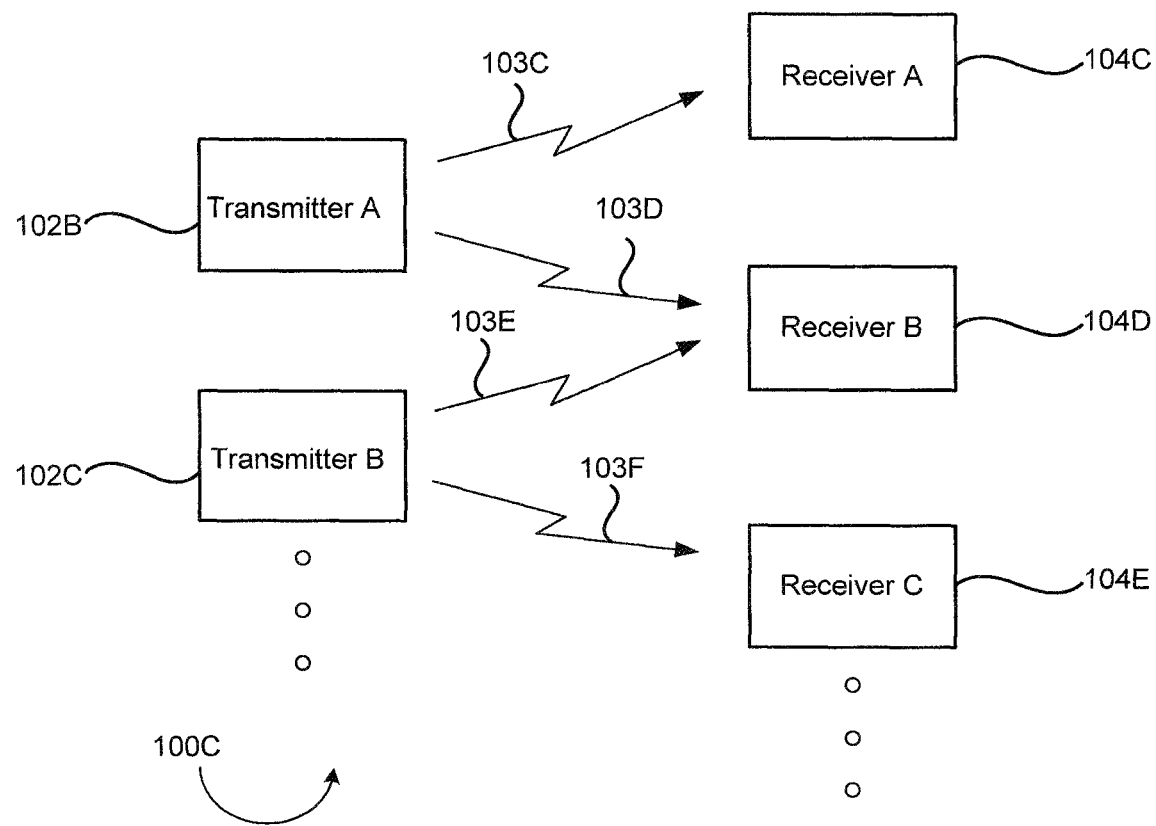
FIG. 1C is a diagrammatic representation of an alternative embodiment of WEDS for a multiple transmission by multiple transmitters to multiple receivers.

FIG. 1C is a diagrammatic representation of the WEDS according to a further alternative embodiment of the invention. The WEDS of this embodiment 100C includes two or more transmitters 102B and 102C and two or more receiver associated with each transmitter 104C, 104D and 104E. Each transmitter includes multiple transmission antenna (not shown) coupled to an effective source of electricity (not shown) and converters associated with each transmit beam to generate associated EM signals. Each transmit antenna transmits its respective EM radiations 103C, 103D, 103E and 103F to associated receiver 104C, 104D, and 104E. Each receiver includes a receive antenna (not shown) and rectifier (not shown) to convert the received EM radiation 103C, 103D, 103E and 103F respectively for receiver 104C, 104D and 104E, into respective suitable electricity which accumulated and then AC or DC conditioned for user application. The WEDS 100C forms a wireless link for transmitting electricity for multiple origin locations to multiple separate and independent destination locations without transmission lines.

Figure 1D:
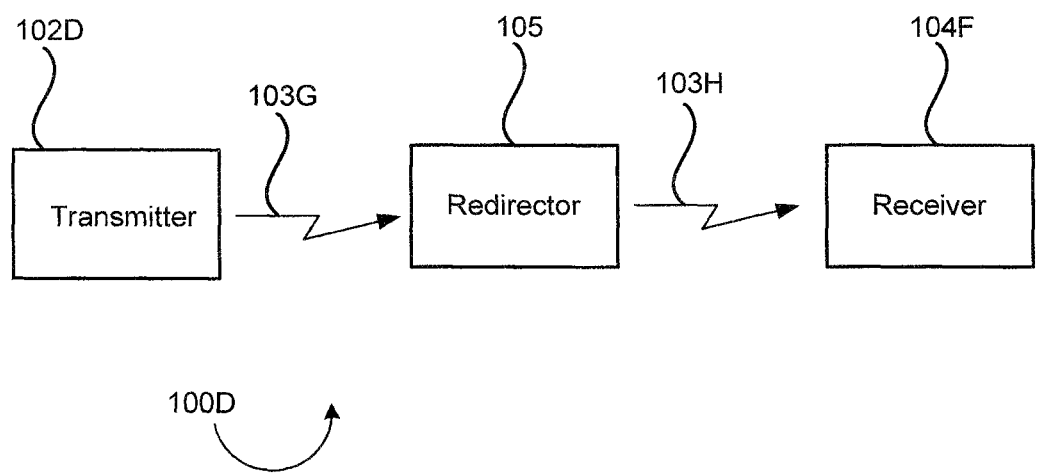
FIG. 1D is a diagrammatic representation of an alternative embodiment of WEDS that includes a redirector for extended range transmission.

FIG. 1D is a diagrammatic representation of the WEDS according to a further alternative embodiment of the invention. The WEDS embodiment 100D includes a transmitter 102D, a receive 104F and intermediate relay redirector 105. The transmitter 102D transmits EM radiation 103C towards the relay redirector 105 which receives the EM radiation rectifies it into electricity then allocates the electricity to one or more redirector transmitters with the power appropriate for the ultimate destination. Allocation is made in accordance with preselected ratios or as a result of data received by the redirector 105 received simultaneously with the EM power radiation. Each redirector transmitter then transmits EM radiation 103H towards receive 104F. The transmitter 102D is like the transmitter 102 of FIG. 1A. The receiver 104F is like the receiver 104 of FIG. 1A. The transmitter 102D is capable of multiple transmissions with data over power and the receiver 104F is capable of multiple beam receptions. The relay redirector 105 includes a receiver sections (not shown) that is capable of receiving one or more EM radiations and includes a transmitter sections (not shown) that is capable of transmitting one or more EM radiations. The relay redirector system 105 also includes an allocator (not shown) that apportions the electricity received from the receiver section to the transmitter section for respective transmissions of the allocated electrical power for the respective destinations. The relay redirector permits an extended transmission distance for the WEDS while maintaining the capability of including multiple origin locations and multiple separate and independent destination locations all without transmission lines.

Figure 2:
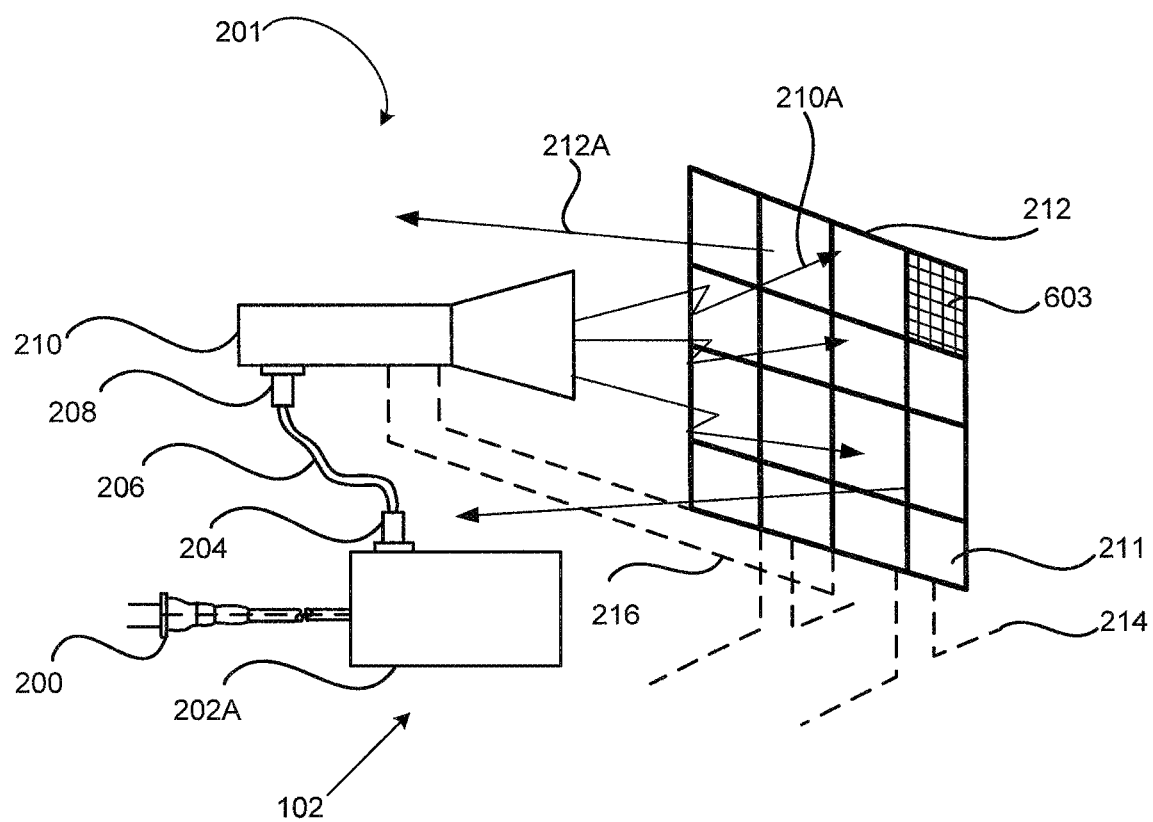
FIG. 2 is a diagrammatic representation of the transmitter according to one embodiment of the invention.

FIG. 2 is a diagrammatic representation of the transmitter 102 of FIG. 1 A according to one embodiment of the invention. The embodiment described is generally directed to a reflectarray antenna 201 and includes a radiating horn 210 and reflectarray antenna aperture 212 for transmitting microwave radiation 212A. The transmitter 102 includes a source of electricity 200, an electricity to microwave signal converter 202A. The microwave converter 202A includes a coaxial cable connection 206 between the microwave converter 202A and the CP radiation horn 210. In various embodiments, the microwave converter is selected from a group of microwave generators for continuous wave (CW) signals including a magnetron, a solid state source, a semiconductor amplifier and several CW or pulse power magnetrons. The preferred embodiment is a 2.45 GHz CW magnetron converter 202A coupled to an AC electricity source 200. The coaxial cable connection 206 includes a first coaxial connector 204 to the microwave converter 202A and a second coaxial connector 208 to the radiating horn 210. The coaxial connection 206 connects the magnetron CW microwave signal source 202A to the CP radiating horn 210 for transmitting the converted microwave single. The transmitter 102 also includes a reflectarray antenna aperture 212 mounted to stand 214 with fixed horn mounts 216 for fixedly securing the radiating horn 210 in fixed relationship to the reflectarray aperture 212. The CP radiating horn 210 illuminates the reflectarray antenna aperture 212 with microwave radiation 210A. The reflectarray antenna aperture 212 reflects a directed and focused narrow beam of microwave radiation 212A. The reflectarray antenna aperture 212 includes, for example, a 4×4 square array of transmit sub-arrays 211 each transmit sub-array 211 includes an array of septum cells modules (not shown).

The architecture of the transmitter 102 is suitable for near range—10 feet or less to 5000 feet and above with transmission powers of 10 watts or less to 1500 watts and above; intermediate range—1 mile or less to 5000 miles and above with transmission powers of 1500 watts or less to 20,000 watts and above; and far range—100 miles or less to 2000 miles and above with transmission powers of 20,000 watts or less to 250,000 watts and above. In addition the preferred embodiment is primarily directed to three microwave frequency bands, namely 900 MHz, 2.45 GHz, and 5.6 GHz. Conceptually any microwave or high frequency EM radiation would be is suitable but these frequencies are preferred due to licensing sensitivities and available components. Additional waveforms like modulated CW and pulsed signals are consistent with this invention. In addition, all vacuum and solid-state sources can operate such signal modes.

Figure 3:
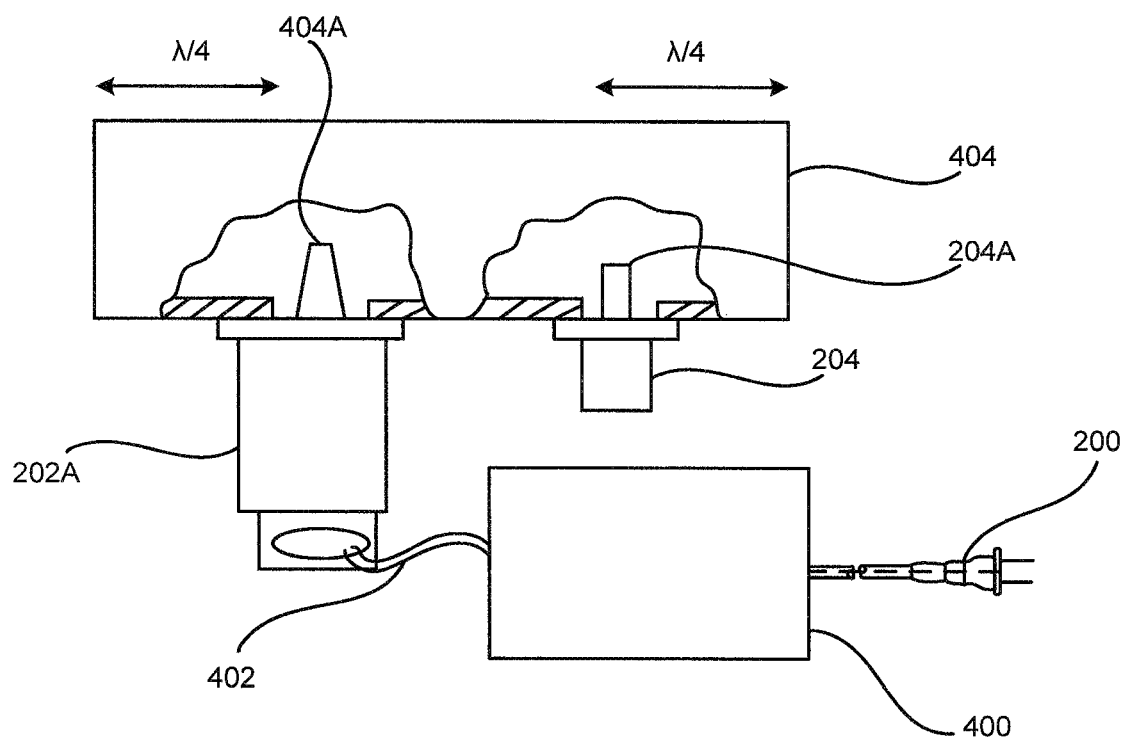
FIG. 3 is a diagrammatic representation of an adjustable power magnetron assembly according to one embodiment of the invention.

FIG. 3 is a diagrammatic representation of an adjustable power magnetron converter 202A of the CW microwave signal according to an alternative embodiment of the invention. In this embodiment the CW microwave converter 202A includes input electrical power control 400 which power control 400 is connected to a source of electricity 200. The microwave signal is provided by the microwave converter 202A. The power controller 400 provides power adjustment of the electricity from the electricity source 200 which adjusted power is connected to the microwave converter 202A through connection 402. The adjusted input power to the microwave converter causes the output power of the microwave signal to follow the input power. The power controller 400 permits the manual or automatic adjustment of the power. In this embodiment the microwave signal is input into a waveguide assembly 404 through probe 404A. The waveguide 404 is a conventional rectangular cross section waveguide. The waveguide 404 input probe 404A is located a distance of ¼ of the wavelength of the microwave frequency from one end of the waveguide 404. At the other end of the waveguide 404 at a distance of ¼ of the wavelength of the microwave frequency from the opposite end a coaxial connector 204 probe 204A is protruding into the waveguide. The waveguide 404 forms a transition of the microwave signal from the magnetron microwave converter 202A or other microwave source to coaxial connector 204 for transmission to the radiating horn 210 of FIG. 2 while enable impedance matching by adjustment of the length of the inserted probes, 404A and 204A. The waveguide 404 operates as an adaptor for microwave power to be connected to the horn 210 by coaxial cable and connections 204 and 208 FIG. 2. The power controller permits adjustment of the power provided by the magnetron microwave converter 202A.

Figure 4A:
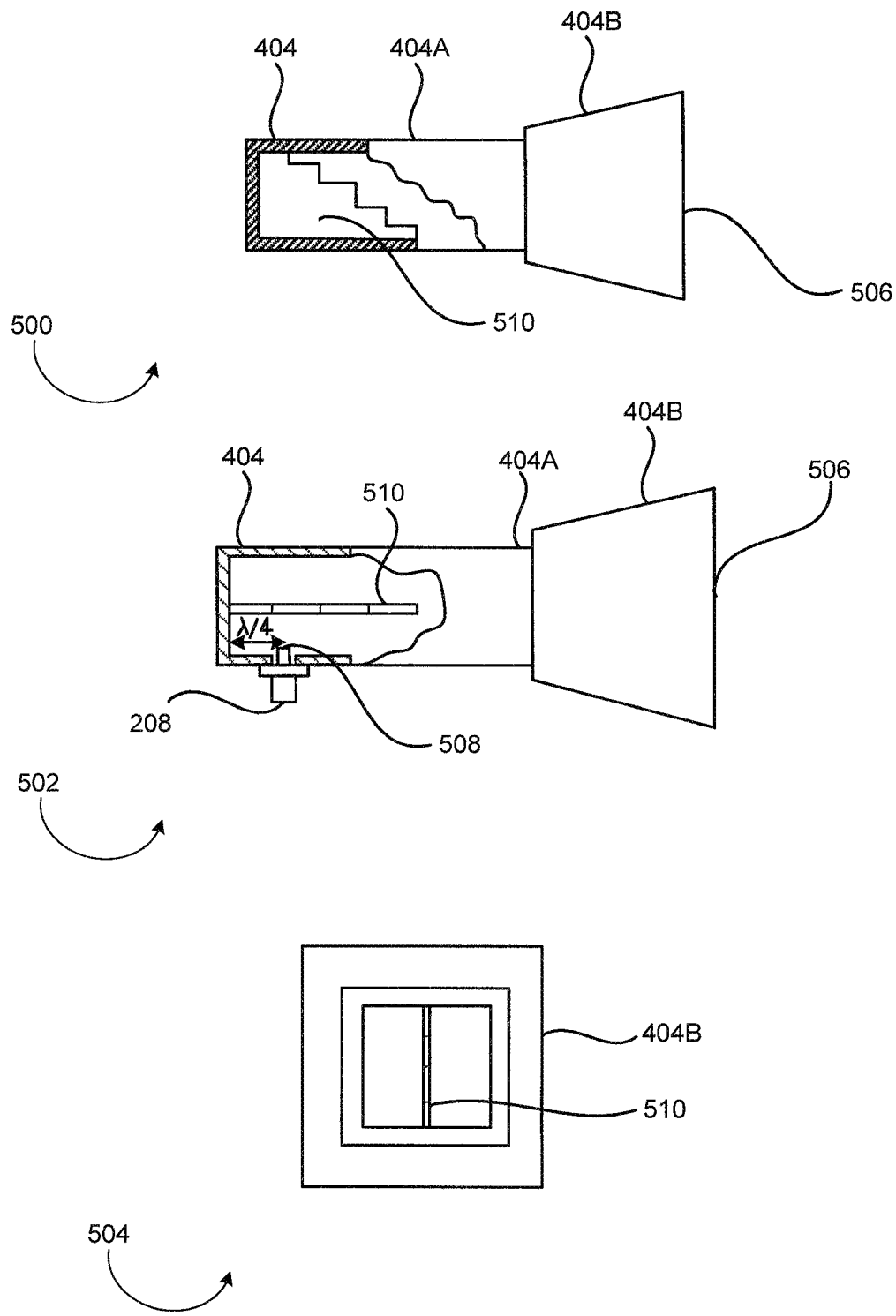
FIG. 4A is a diagrammatic representation of a square cross section circular polarized (CP) radiating horn.

FIG. 4A is a diagrammatic representation of a broken side elevation views 500, a broken top plan view 502 and a front view 504 of a square cross section radiating horn 404 according to an embodiment of the invention. The square cross-section horn 404 includes an internal central top to bottom stepped septum 510 extending from the back wall of the horn 404 to the approximate center of the waveguide section of the horn 404 with the septum 510 having a number of spaced steps such as the evenly spaced 5 steps in this representation. The top view 502 of horn 404 shows coaxial connector 208, with a coaxial to wave guide adapter probe 508 protruding into the horn that is located in the side of the horn approximately ¼ wavelength of the microwave frequency from the horn's closed end. The stepped septum 510 converts the input microwave single polarized excited mode field into two orthogonally polarized mode fields with quadrature phase shift. This combination of two modes radiates from the open cone 404B of the horn 404 as an effective circular polarized microwave radiation.

Figure 4B:
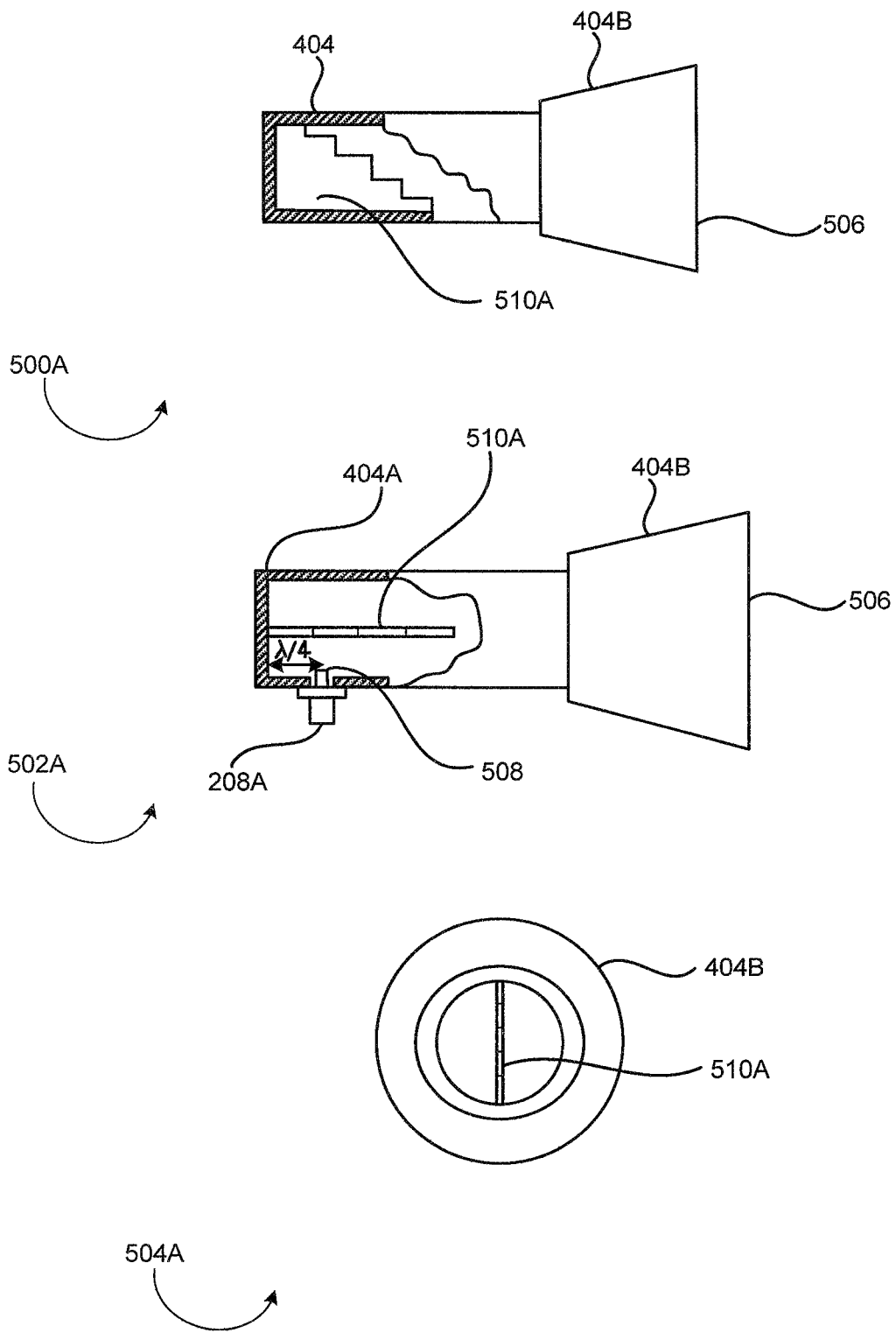
FIG. 4B is a diagrammatic representation of a circular cross section CP radiating horn.

FIG. 4B is a diagrammatic representation of a broken side elevation view 500A, a broken top plan view 502A and a front view 504A of a circular cross section radiating horn 404A according to an alternative embodiment of the invention. The circular cross section horn 404A includes an internal central top to bottom stepped septum 510A extending from the back wall of the horn 404A to the approximate center of the waveguide section of the horn 404A with the septum 510A having a number of spaced steps, vertical and/or horizontal, such as the 5 steps in this representation. The top view of horn 404A shows coaxial connector 208A, with a coaxial to wave guide adapter probe 508A protruding into the horn that is located in the side of the horn approximately ¼ wavelength of the microwave frequency from the horn's closed end. The stepped septum 510A converts the input microwave single polarized excited mode field into two orthogonally polarized mode fields with quadrature phase shift. This combination of two modes radiates from the open cone 404B of the horn 404 as an effective circular polarized microwave radiation.

The reflectarray antenna aperture 212 of FIG. 1 is a modular design having transmit sub-array modules 211 each transmit sub-array modules having an array of separate reflector cell modules (not shown). The size of the reflectarray antenna aperture 212, the transmit sub-array 211 and reflector cells is optimized in consideration of the microwave frequency, the reflectarray antenna aperture size and shape, and the transmit sub-array 211 size and the distance between transmitter and receiver. Other criteria used to optimizing the size and shape to the reflectarray antenna aperture include near field range, electrical components and their inner-connectivity considerations.

Figure 5A:
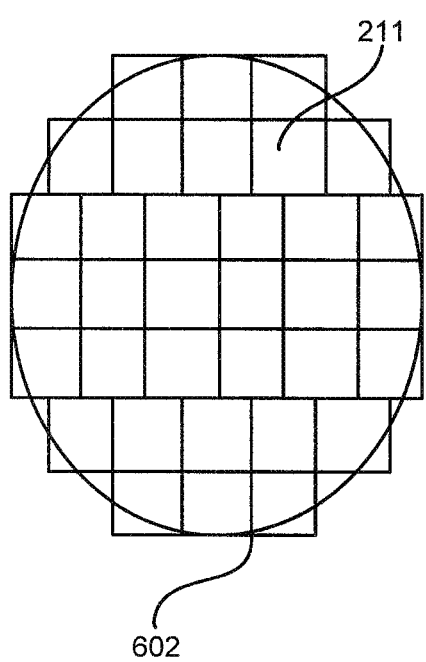
FIG. 5A is a diagrammatic representation of a circular/elliptical array of a reflectarray antenna aperture showing transmit sub-array modules according to one embodiment of the invention.

FIG. 5A is a diagrammatic representation of a generally circular reflectarray antenna aperture 602 assembled from transmit sub-array modules 211 according to an embodiment of the invention.

Figure 5B:
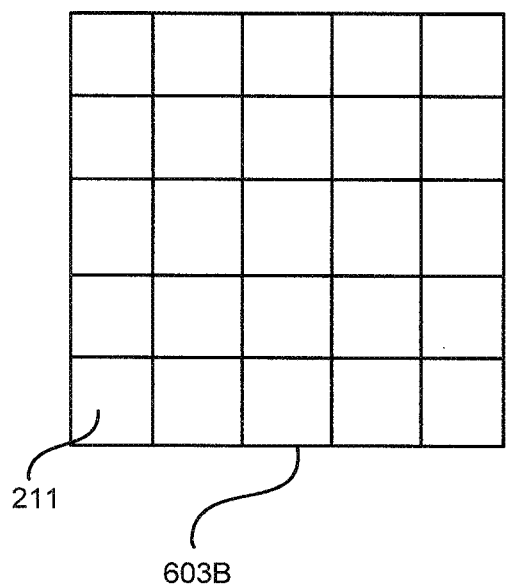
FIG. 5B is a diagrammatic representation of a square array of a reflectarray antenna aperture showing transmit sub-array modules according to one embodiment of the invention.

FIG. 5B is a diagrammatic representation of generally square shaped reflectarray antenna aperture 603B assembled from transmit sub-array modules 211 according to an embodiment of the invention. Based upon optimization criteria the overall aperture size and shape may take alternative dimensions and forms, such as: elliptical, rectangular, triangular or the like.

Figure 6A:
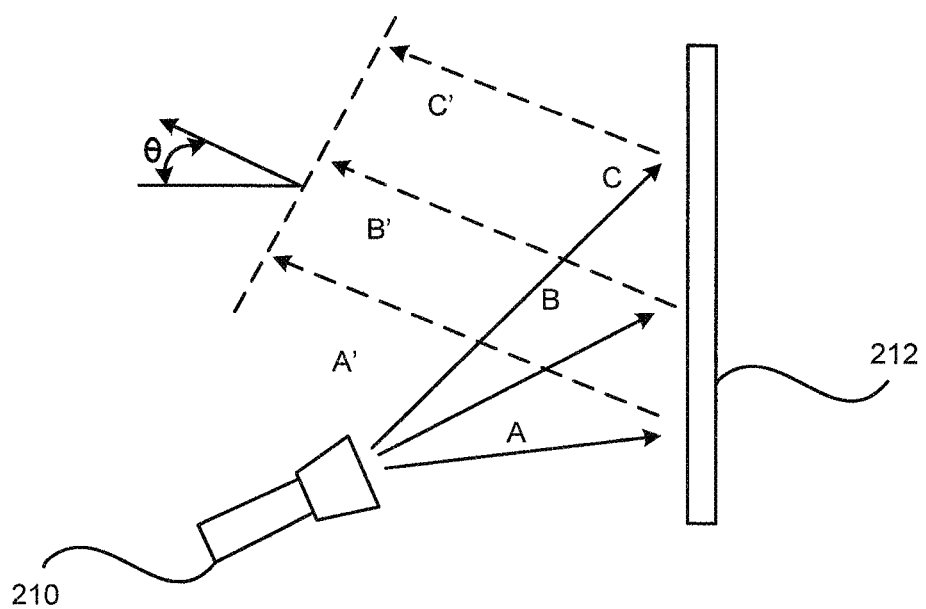
FIG. 6A is a diagrammatic side-view representation of the operating principle of a reflectarray antenna.

FIG. 6A is a diagrammatic representation of the operational principle of the reflectarray antenna 201 of FIG. 2 including the radiating horn 210 and reflectarray antenna aperture 212. The horn 210 illuminates the aperture 212 with radiation represented as inbound EM radiation rays A, B, and C. These rays expose the surface of aperture 212 where they are electromagnetic reflected as outbound EM radiation represented as rays A', B', and C'.

Figure 6B:
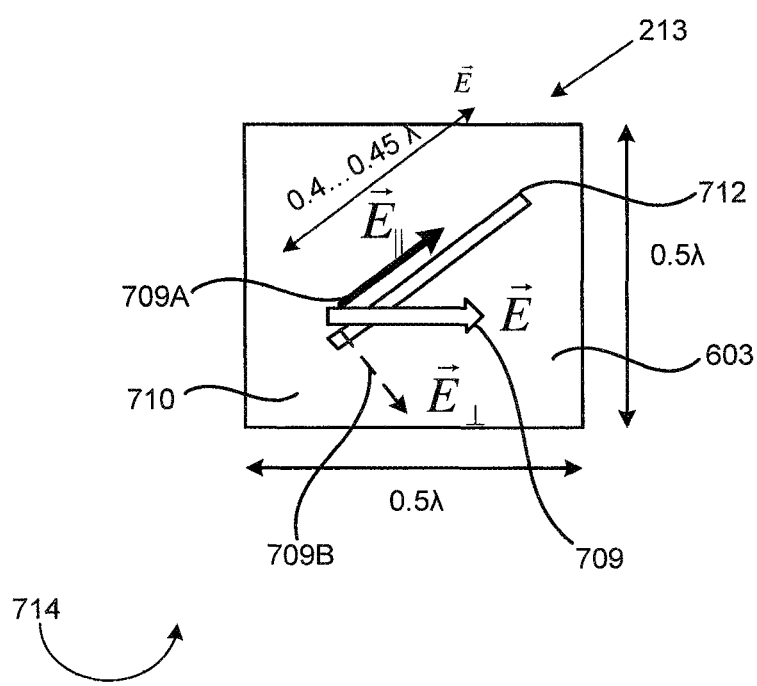
FIG. 6B is a diagrammatic top-view representation of the elevation of a rotatable reflector cell.

View 714 of FIG. 6B is a representative view of an example of a rotatable septum cell 213 showing a vertically mounted metallic rotatable septum 712 that is mounted to metal ground base 710. View 714 of FIG. 6B shows, as an example, the top edge of the rectangular shape of the septum 712. Alternative septum shapes are within the concept of this invention. A vertical septum 712, for each reflector cell 213 is mounted on a central axis to facilitate rotation. The degree the septum is rotated influences the phase of the reflected EM radiation when the cell is illuminated by CP radiation. For CP radiation, the radiation electrical vector E 709 of the arbitrary illuminating EM radiation that can be decomposed into two components; one parallel to the septum 709A and one perpendicular to the septum 709B. The parallel component 709A will be reflected off the top edge of the septum while the perpendicular component 709B will not interact with the septum but will be reflected off the ground plane 710. In addition, the perpendicular component 709B passes the additional distance to the ground plane 710 and back which distance is equal to twice the height of the septum or approximately 2 times ¼ of wave length of the microwave radiation. The reflected perpendicular component 709B has a phase different than the reflected parallel component 709B. The magnitude of the EM radiation vectors of reflected perpendicular vs. parallel components is influenced by the angle of each septum in the reflector cells 213. The difference in the phase and magnitude of the EM vectors introduces a controllable phase difference in the components of the reflected beam which phase difference, under the principles of superpositioning, launches the reflected the beam in a determinable direction if superimposed with E field of adjacent cells. In FIG. 6E, the top of the septum 712 is approximately ¼ wave length off the base 710 of the cell. The cell is approximately ½ wave length square. The width of the septum is between approximately 0.4 and 0.45 the wave length. The septum is rotated manually or by a controlled motor 710A, FIG. 6E. Typically the manual rotation is suitable and more cost effective for a static, non-moving, transmitter and receiver.

Figure 6C:
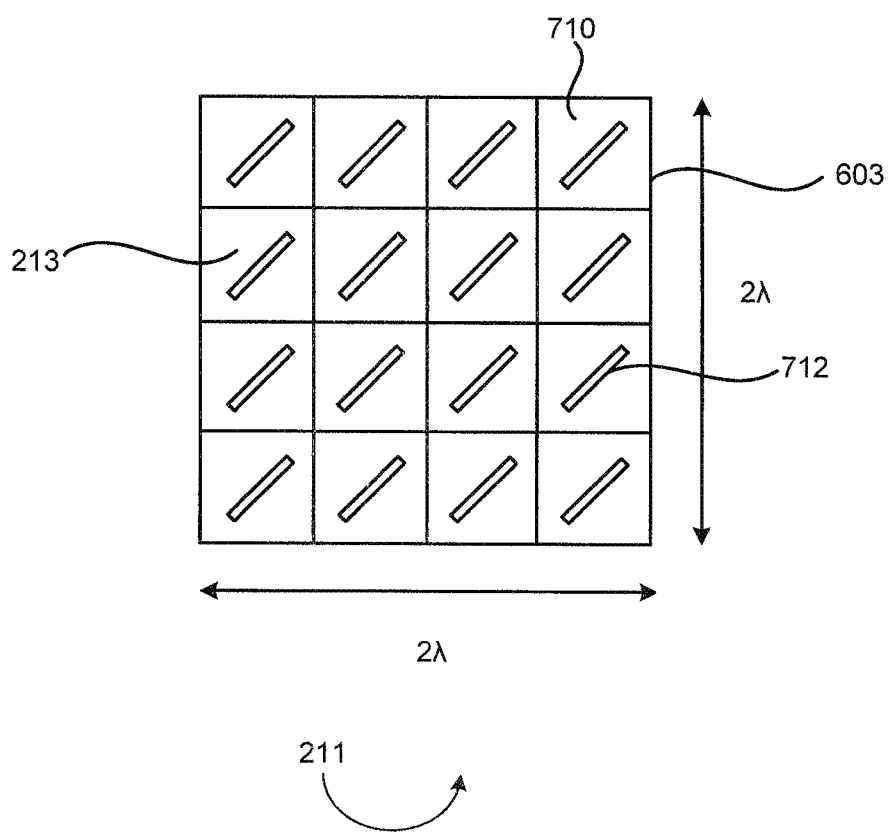
FIG. 6C is a diagrammatic top-view representation of a transmit sub-array module showing the rotatable perpendicular cell septum elements shown in a parked position.

FIG. 6C is a diagrammatic representation of a transmit sub-array module 211 of the reflectarray antenna aperture 212 of FIG. 2 showing an array of rotatable septum cells 603 according to an embodiment of this invention. Specifically the transmit sub-array 211 includes a 4×4 square sub-array module of 16 septum cells 603. The modular design permits the reflectarray antenna aperture 212 of the electricity distribution system 100, including the transmit sub-arrays 211 and the reflector cells 603, of this invention, to be assembled from identical building blocks. The transmit sub-array 211 of this 4×4 element embodiment is approximately 2 wavelengths square and the individual reflector cells are approximately 0.5 wavelengths square. In this example, the rotatable septums 712 of each rotatable cell 603 are shown in the home or parked position ready for orientation as required by the anticipated direction, distance and focus of a particular application.

Figure 6D:
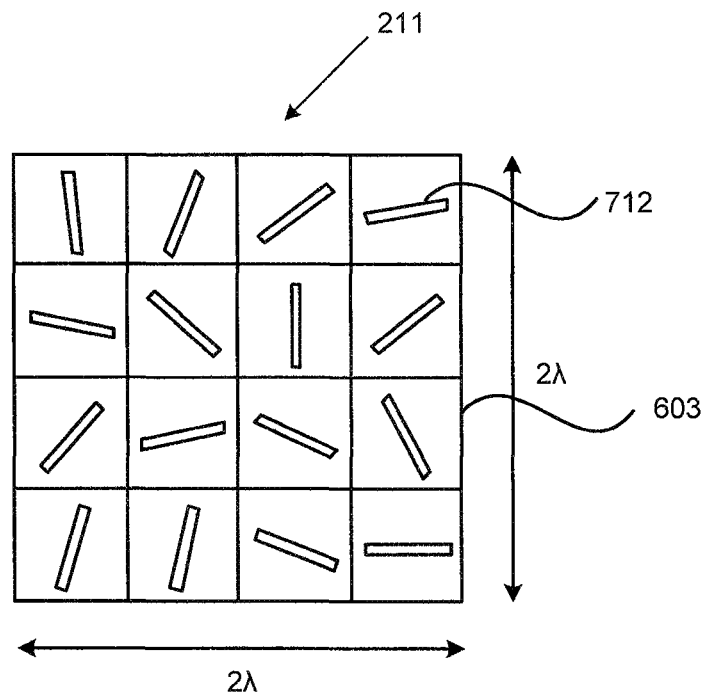
FIG. 6D is a diagrammatic top-view representation of a transmit sub-array module showing the rotatable perpendicular cell septum elements shown in a representative operating orientation.
Figure 6E:
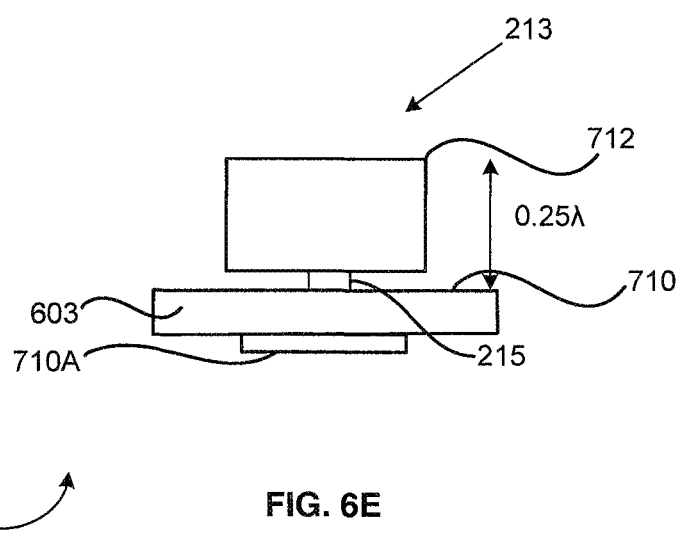
FIG. 6E is a diagrammatic representation of a plan view of a rotatable reflector cell.

FIG. 6D is a diagrammatic representation of the transmit sub-array module 211 with the plurality of rotatable cells 603 each having a rotatable septum 712. The rotatable septum 712 of each septum cell 603 is shown as a particular radiation beam for a particular application. The individual septums may be rotated to their respective active positions either manually or automatically by controlled motor (not shown) or possible beam steering on assembling stage for fixed beam.

Figure 7A:
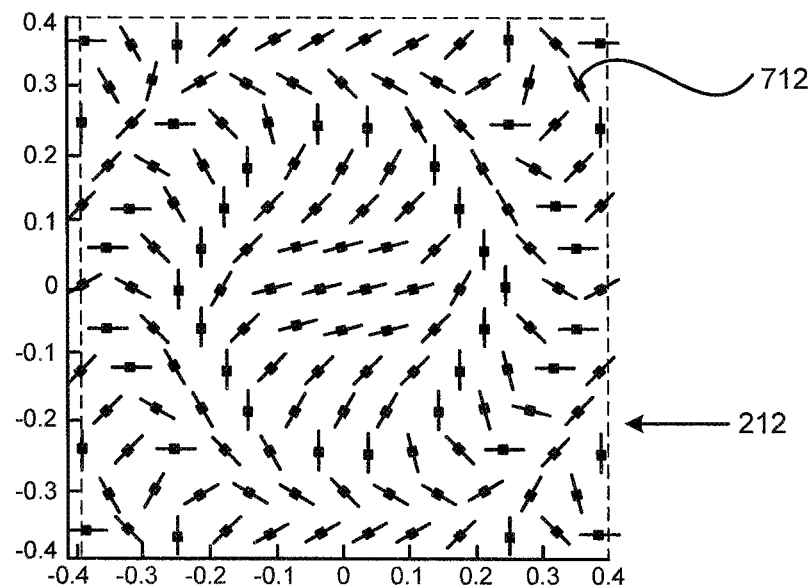
FIG. 7A is a diagrammatic representation of a reflectarray antenna aperture showing a representation of a plurality of rotatable cell septum elements oriented in a centrally aligned operating orientation.

FIG. 7A is a diagrammatic representation of the reflectarray antenna aperture 212 with the separate transmit sub-modules (not shown) and the separate rotatable cells (not shown) are not visible in this representation. FIG. 7A shows the separate rotatable septum 712 represented in a specific orientation. The total array of septum in this example is a 12×13 array of elements. The orientation of the EM radiation of this example would produce a generally broadside central EM beam. The representation of FIG. 7A shows an alternative embodiment of the WEDS wherein the transmit sub-arrays are eliminated and all transmit cells are mounted with in the rectenna antenna aperture.

Figure 7B:
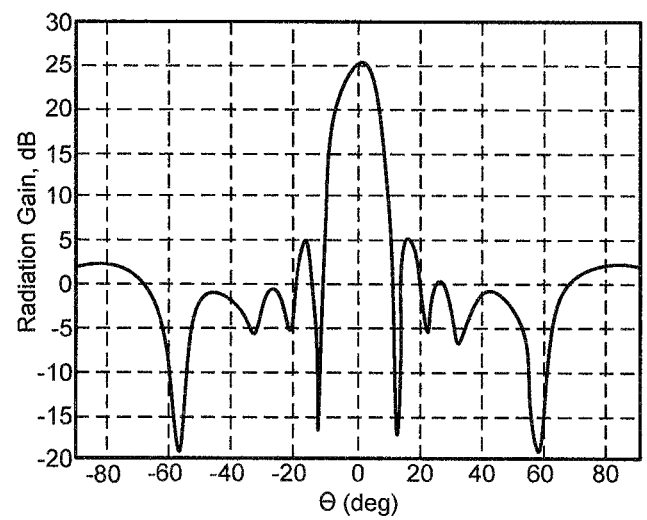
FIG. 7B is a diagrammatic representation of the radiation pattern produced from a centrally aligned operating orientation.

FIG. 7B is a representation of the radiation pattern developed form superpositioned EM radiation produce from the orientation of the each cell septum 712 of the reflectarray antenna aperture shown in FIG. 7A.

Figure 8A:
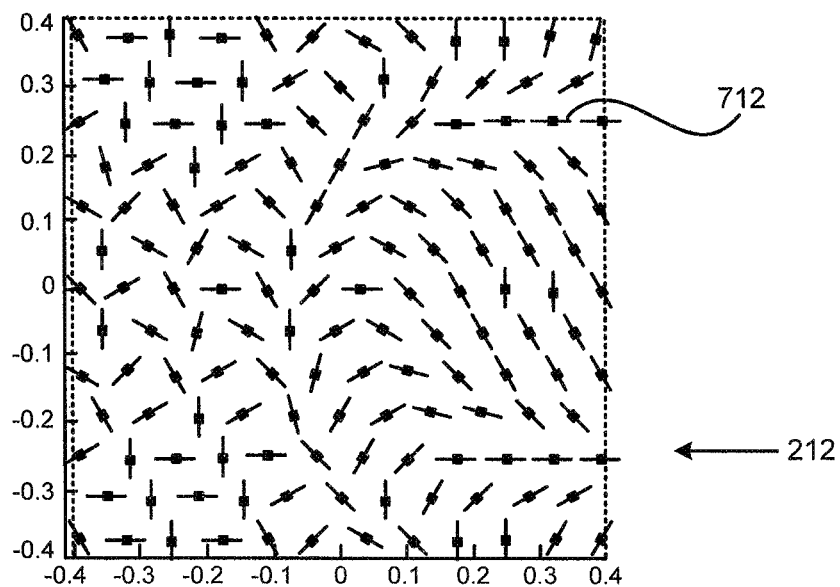
FIG. 8A is a diagrammatic representation of a reflectarray antenna aperture showing a representation of a plurality of rotatable cell septum elements oriented in a 30 degree right shift orientation.

FIG. 8A is a diagrammatic representation of the reflectarray antenna aperture 212 with the separate transmit sub-array modules (not shown) and the separate rotatable cells (not shown) are not visible in this representation. FIG. 8A shown the separate rotatable septum 712 represented in a specific orientation. The total array of septum in this example is a 12×13 array of elements. The orientation of the separate septums of the array of this example would produce a beam off-set from the central orientation of FIG. 7A.

Figure 8B:
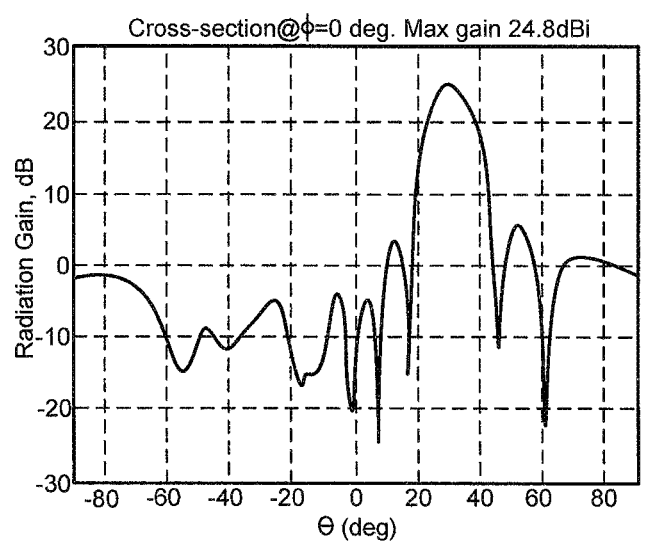
FIG. 8B is a diagrammatic representation of the radiation pattern produced from a 30 degree right shift orientation.

FIG. 8B is a representation of the radiation pattern produced from superpositioned EM radiation produced from the orientation of each cell septum 712 of rotatable cells (not shown) of transmit sub-array modules (not shown). The radiation pattern shows a 30 degrees right shift due to the relative angular orientations of the septum 712. In this particular example the separate septum are rotated for a receiver that is 30 degrees to the right of center. Generally the shift range of directivity is achievable between ±60 degrees spatial cone at broadside. More conventionally the range of directivity is ±45 degrees horizontally and vertically. Additional directivity can be provided by a gambled mounting of the rectenna antenna to a stand.

Figure 9:
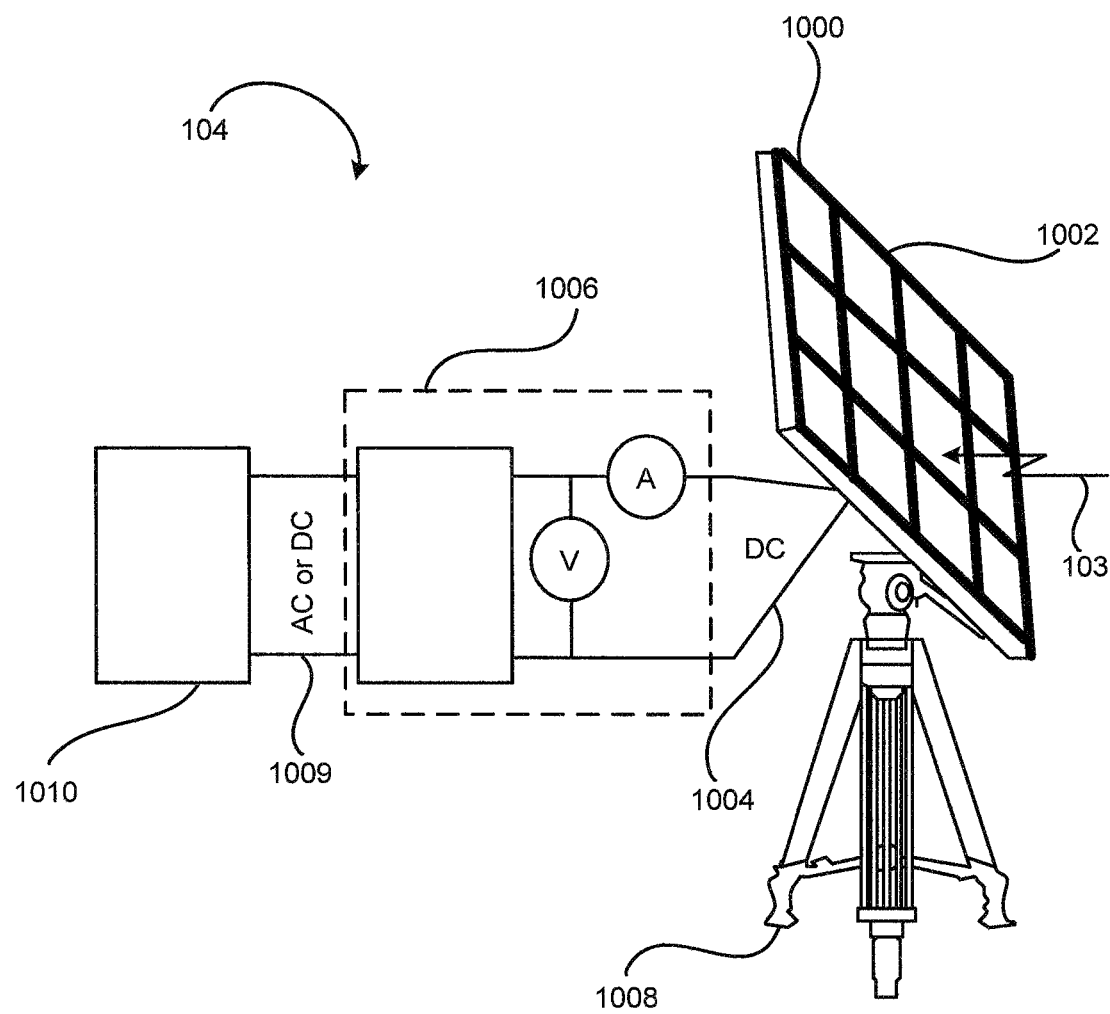
FIG. 9 is a diagrammatic representation of the receiver according to one embodiment of the invention.

FIG. 9 is a diagrammatic representation of a receiver 104 of FIG. 1A according to an embodiment of the invention. The receiver 104 includes a rectenna array aperture 1000. The rectenna array aperture 1000 further includes an array of receiver sub-arrays 1002 configured in a 3×4 rectangular shaped array. The rectenna array aperture 1000 provides DC electricity 1004. The receiver 104 further includes a power conditioner 1006 which receives the DC electricity 1004 from the rectenna array aperture 1000 and produces conditioned AC or DC electricity 1009 with voltage V and current A measurements. An electrical user load is represented at 1010 that is connected to the conditioned power 1009. Alternative configurations of receiver sub-arrays 1002 are configured to the needs of the environment based upon frequency, directivity, focus and range and may be of rectangular, circular or elliptical shape. The receiver sub-array 1002 is modular as building blocks for the ultimate rectenna antenna aperture 1000. In an alternative embodiment the power conditioner 1006 includes maximum power which by changing equivalent resistive load operates to maximum efficiency by converting the captured EM radiation 103. The efficiency of the receiver 104 depends upon the EM radiation 103 input power and the load 1010. The receiver 104 includes a gimbaled or stationary rectenna mount 1008. If RF input power is varied changing effective resistive load will permit, to some extent, keep the maximum RF to DC power efficiency.

Figure 10:
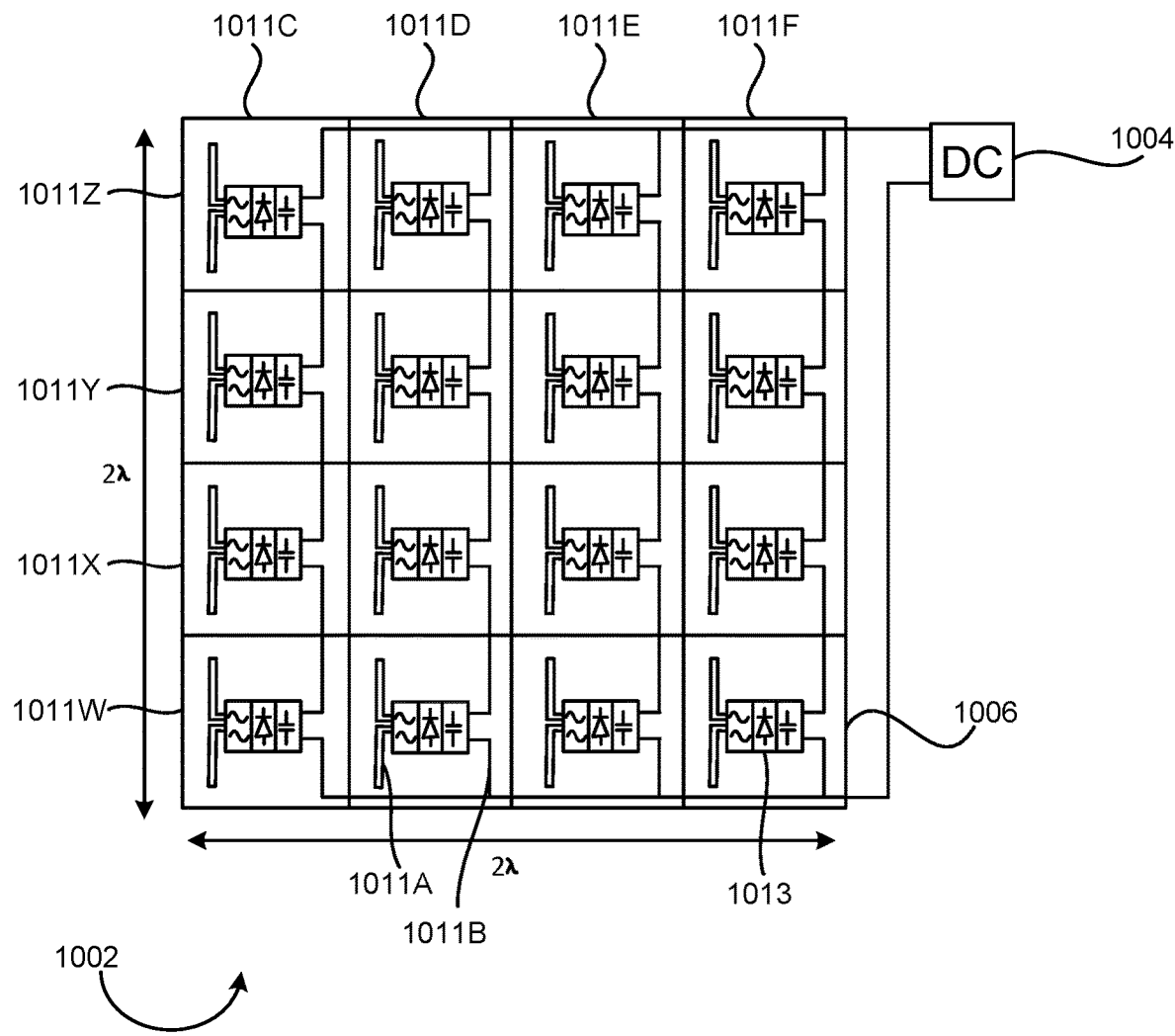
FIG. 10 is a diagrammatic representation of a receiver sub-array module showing receiver cell with representative receiver cell electronic.

FIG. 10 is a diagrammatic representation of a receiver sub-array 1002 of the rectenna antenna aperture 1000 of FIG. 9 having a square 4×4 array of receiver cells 1011. The receiver sub-array 1002 provides DC power output 1004 according to an embodiment of the invention. Each of the receiver cells of the receiver sub-array 1002 produces a receiver cell DC power output 1011B and the plurality of receiver sub-array include connectivity circuitry of series or parallel connections to produce the receiver sub-array DC power 1004. The receive cell 1011 are modular permitting flexibility to the shaped and size of the receiver sub-array module 1002. Each receive cell is approximately)/2 wavelength square which makes the receiver sub-array 1002 approximately 2 wavelengths square. Each receive cell includes respective cell circuitry 1013 including a dipole antenna element to capture incident EM radiation 1011A and cell rectifier to produces the DC cell output power 1011B. The DC cell output power 1011B is produced by the respective cell rectifier circuits 1013 which are connected in parallel or series in accordance with achieving better conversion efficiency. For example, adjacent cells 1011W, 1011X, 1011Y, and 1011Z are connected in series forming a cell column 1011C. Receiver cell columns 10110, 1011D, 1011E, and 1011F are connected in parallel to generate received DC power output 1004.

Figure 11:
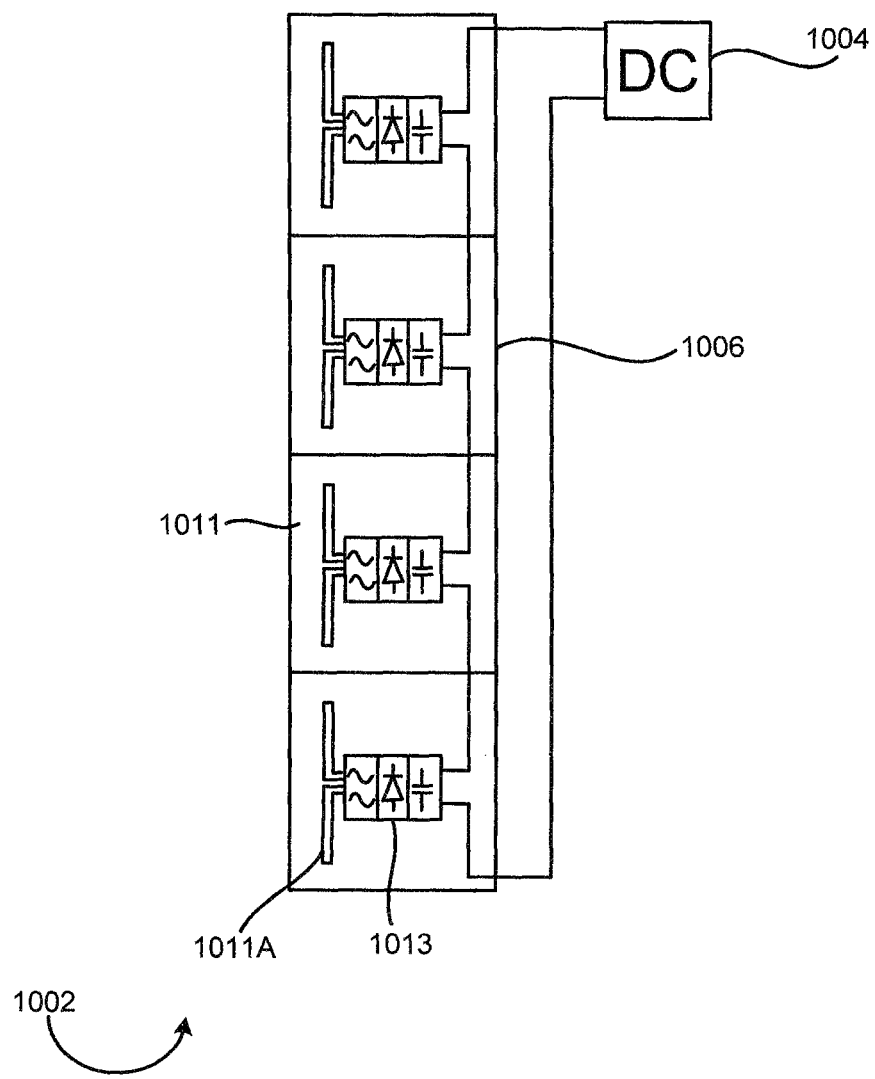
FIG. 11 is a diagrammatic representation of a line receiver sub-array module having four receiver cells.

FIG. 11 is a diagrammatic representation of linear receiver sub-array 1002 of an alternative structure according to another embodiment of the invention showing the capabilities of modular receiver cell modules 1011. The receive cells 1011 includes receiver cell circuitry 1013 including dipole antenna elements 1011A. The receive cells 1011 are connected in series to generate the received DC power output 1004. The receiver cells of this configuration are structured as a single row receiver sub-array 1002.

Figure 12A:
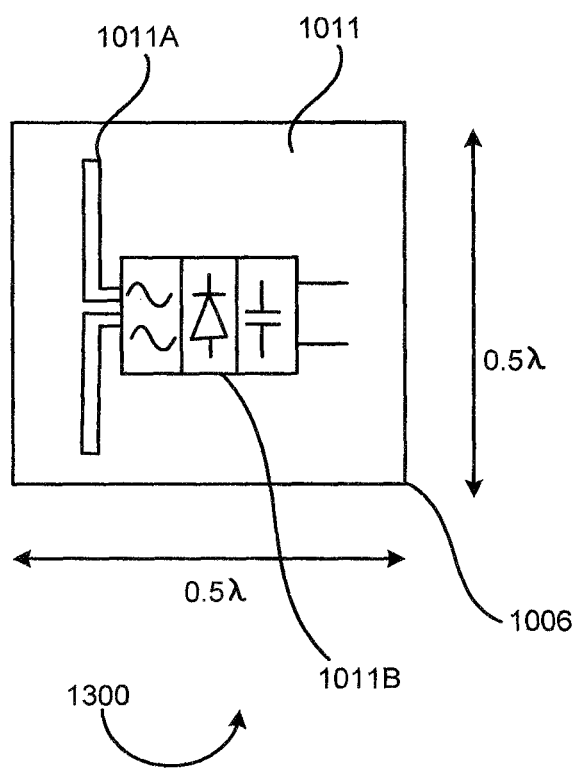
FIG. 12A is a diagrammatic representation of an individual receiver cell.
Figure 12B:
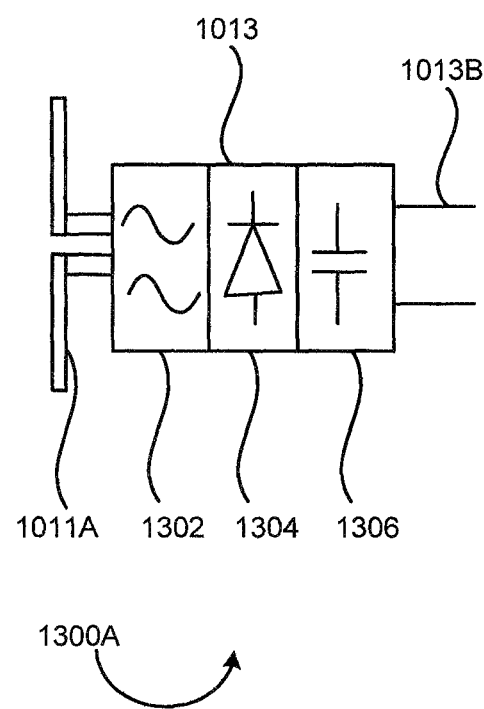
FIG. 12B is a diagrammatic representation of the receiver cell electronics.

FIG. 12A is a diagrammatic representation of first view 1300 of an individual receiver cell 1011 and FIG. 12B is a second representative view 1300A of the cell rectifier circuit 1013 according to an embodiment of the invention. The receiver cell 1011 is a single linear polarized receiving antenna element. The receiver cell is ½ wave length square where the wave length is that of the frequency of the microwave radiation. The receiver cell circuit 1013 includes a dipole antenna element 1011A, input filter matching circuit 1302, rectifier circuit 1304, and low pass filter 1306. The filter matching circuit 1302 is positioned between the antenna element 1011A and a rectifier circuit 1304. The low pass filter 1306 is positioned between the rectifier circuit 1306 and the DC cell output power 1011B.

Figure 13:
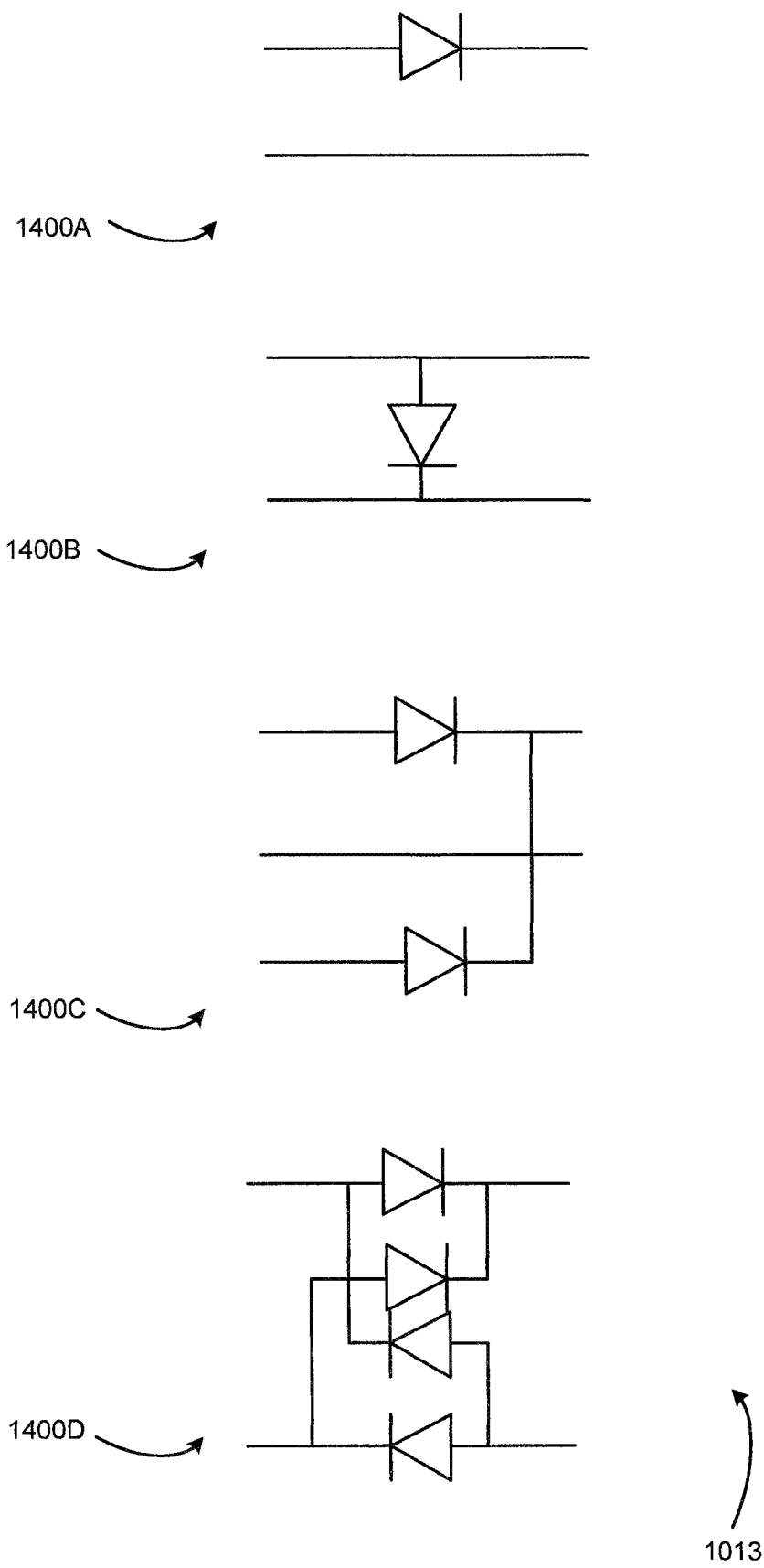
FIG. 13 is a diagrammatic representation of alternative circuits for the microwave rectifier of the receiver cell electronics.

FIG. 13 is a diagrammatic representation of four alternative embodiments of the rectifier circuit 1013. The four major alternatives include a series half-wave rectifier 1400A; a shunt half-wave rectifier 1400B; a full-wave rectifier using a center tap 1400C; and a full-wave rectifier 1400D. These and other rectifier circuits known to those skilled in the art have benefits and limitations considered in selection of the most suitable for the given application. The diodes represented are suitable for microwave frequencies. The microwave rectifier diodes give typically notable parasitic resistance and capacitance along with the parasitic packaging inductance and capacitors. The large parasitic diode impedance components results in the current flow through the microwave rectifier diode to influences the RF-to-DC conversion efficiency. In addition, transistors could be used as the rectifying elements as reported in the literature regarding rectifiers.

Figure 14:
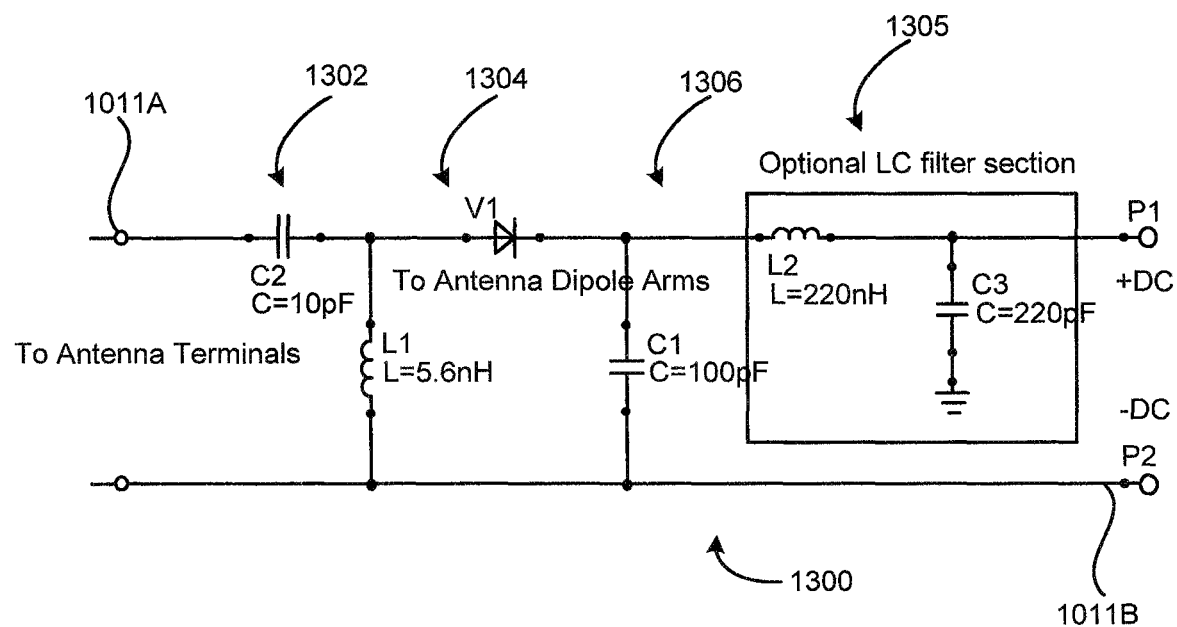
FIG. 14 is a diagrammatic representation of the cell electronic of a receiver cell showing representative components according to one embodiment of the invention.

FIG. 14 is a diagrammatic representation of the cell electronics 1013 of the receiving cell 1300 showing receiver EM field capturer connection 1011A, filter matching circuit 1302, rectifier 1304, and lowpass filter 1306. The embodiment of FIG. 14 also includes an optional LC filter section 1305 according to an alternative embodiment of the invention. In this embodiment the filter matching circuit 1302 includes capacitor C2 and inductor L1. The filter matching circuits 1302 is connected to the dipole antenna element (not shown). The filter matching circuit 1302 is coupled to the rectifier 1304 with diode V1 which is then coupled to low pass filter 1036 with capacitor C1. In this embodiment an optional LC filter section is provided with inductor L2 and capacitor C3. DC cell output power is provided at 1011B. The given component values are examples for a low power short range application and would vary based on range and power in accordance with the knowledge of those skills in the art. The circuits are mounted onto a printed circuit board. The dipole itself is a portion of the printed circuit board, see FIGS. 17A and 17B for an example of such circuitry. The receiver cell 1300 is the electronic circuitry 1013 for one receiving cell 1300 of a series linear printed circuit board (not shown) which circuit board is vertically mounted to a back plane. Multiple linear printed circuit boards are mounted in parallel to form a receiver cell array structure that form a receiver sub-array module 1002 FIG. 20 which together with other receiver sub-array modules provides the antenna reflectarray antenna aperture 1000 FIG. 9.

Figure 15:
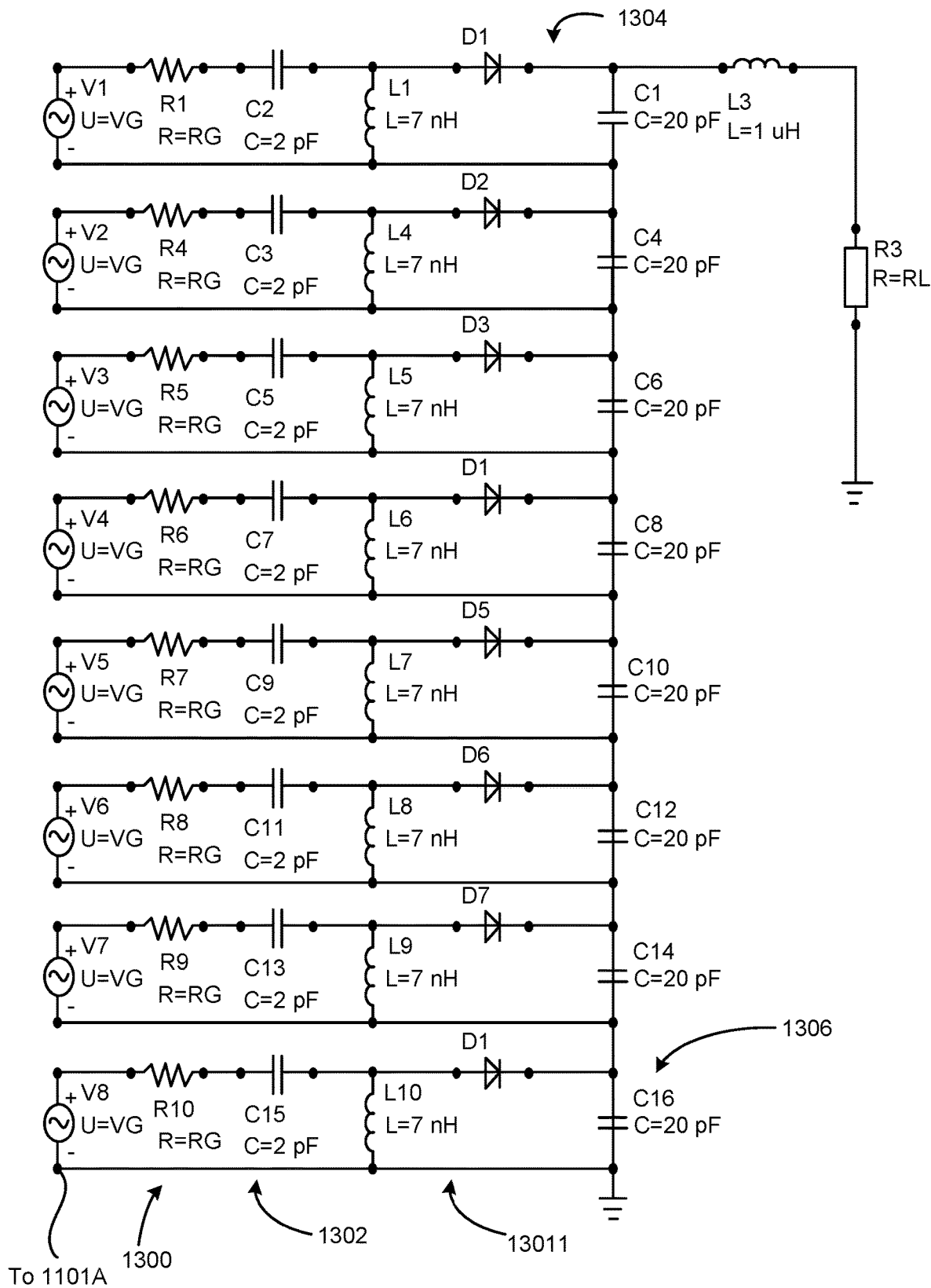
FIG. 15 is a diagrammatic representation of an alternative for the cell electronics of a line receiver sub-array module having eight receiver cells showing representative components according to one embodiment of the invention.

FIG. 15 is a diagrammatic representation of an alternative circuit arrangement of an 8 receiver cell linear printed circuit board forming a one row receiver sub-array module 1302. The cell electronics 13011 of this embodiment depicts a partial structure of the receiving cells modules 1300. Circuit component are shown for demonstrative purposes for an alternative version of a low power short range application. The half-wave rectifier 1304 of the cell electronics 13011 in this example provides efficient circuit topology and optimal loading conditions.

Figure 16:
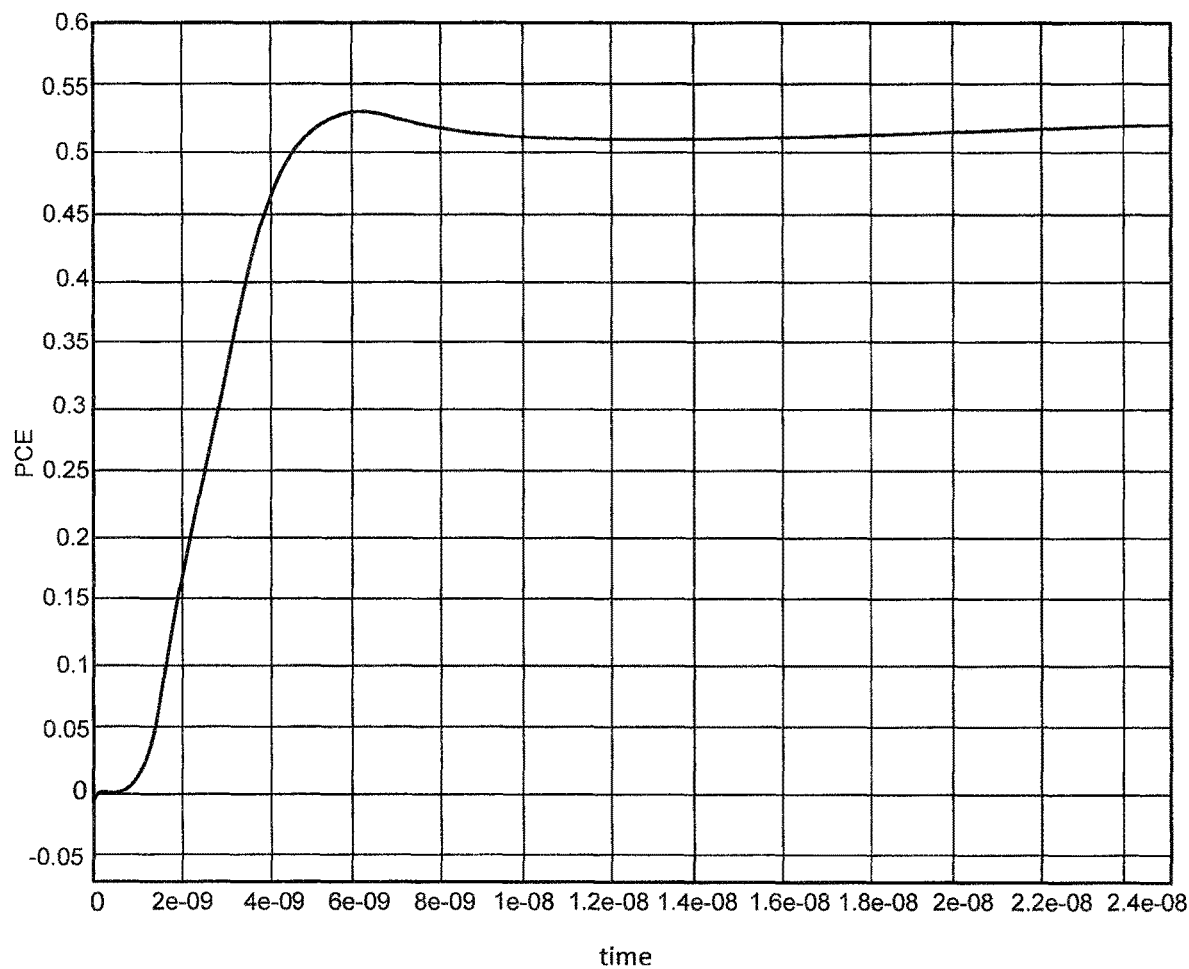
FIG. 16 is a graphical representation of the simulated results of power conversion efficiency v. PCE time.

FIG. 16 is a graphical representation of a simulation to show the power conversion efficiency (PCE) over time from the moment when the RF power is applied. As demonstrated the PCE reaches 50% of the total efficiency according to the embodiment of FIG. 15 by using commercial diodes at frequency 5.6 GHz.

Figure 17A:
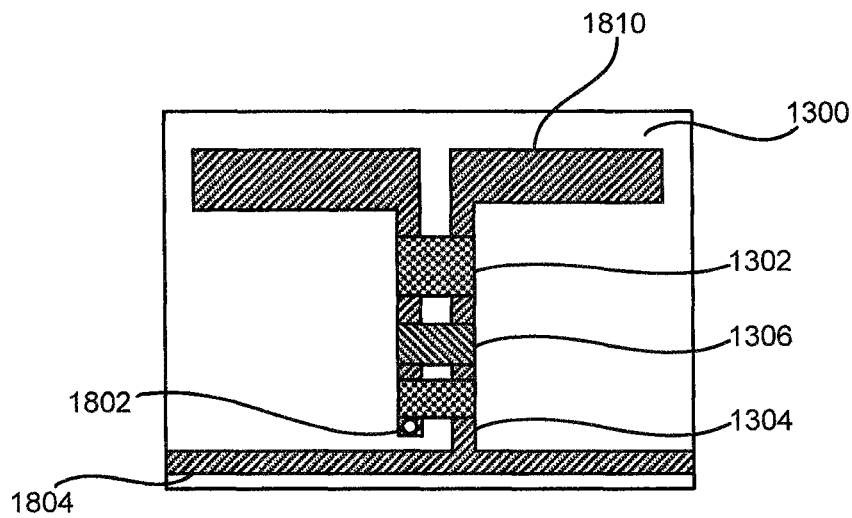
FIG. 17A is a diagrammatic representation of the front face of an individual receiver cell of one embodiment of the invention, on a printed circuit board.
Figure 17B:
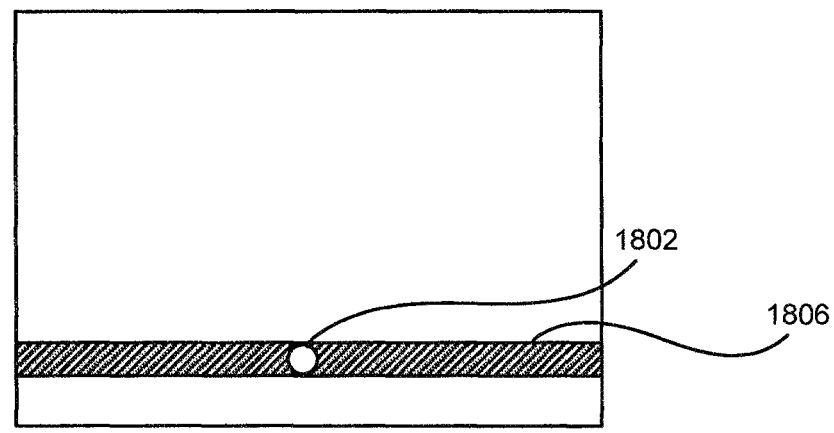
FIG. 17B is a diagrammatic representation of the back face of an individual receiver cell of one embodiment of the invention.

FIG. 17A is a diagrammatic representation of the front face 1800A of a single receiving cell 1300. The receiving cell 1300 includes dipole 1810, filter matching circuit 1302, rectifier 1306 and low pass filter 1304. The receiver cell 1300 is fabricated on a 2 sided printed circuit board with the land shown is dark shadow. In this embodiment the receiving cell is approximately ¼ wave length high (of the microwave radiation being transmitted) and ½ wave length wide. The front face 1800A includes one buss of the output DC plus power 1804 with the other buss of the output DC minus power 1806 shown on the back face 1800B in FIG. 17B. Via 1802 shows the via connection between the face 1800A and the back 1800B for the other buss.

Figure 18:
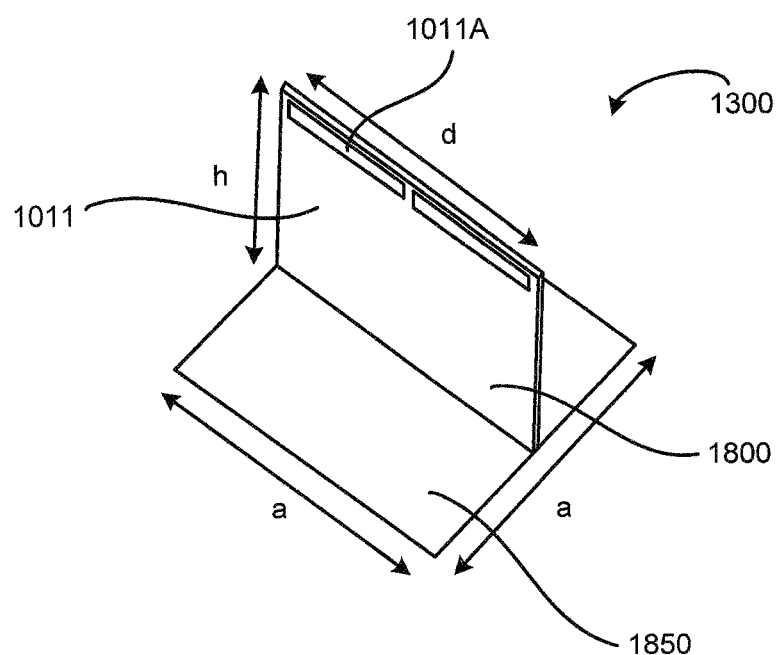
FIG. 18 is a diagrammatic perspective-view representation of the vertical orientation of one septum of a reflector cell showing a representative dipole as the radiation exciter.

FIG. 18 is a diagrammatic perspective-view representation of the orientation of a receiving cell 1300 showing one receiver cell 1300 positioned on an upright 1800 vertically mounted to a back plane 1850 with the dipole 1011A oriented along the top edge of the upright 1800 of receiver cell 1300. In a preferred embodiment a sequence of 8 of such receiver cells are liked into a single row with 8 parallel rows fixed to a single back plane 1850 providing an 8×8 array of receiver cells 1300 for one receiver sub-array module FIG. 21. The size of the receiver cell is a function of the frequency of the microwave radiation with the dimensions a and d generally equal to ½ the wave length and with the dimensions h equal to ¼ the wave length.

Figure 19:
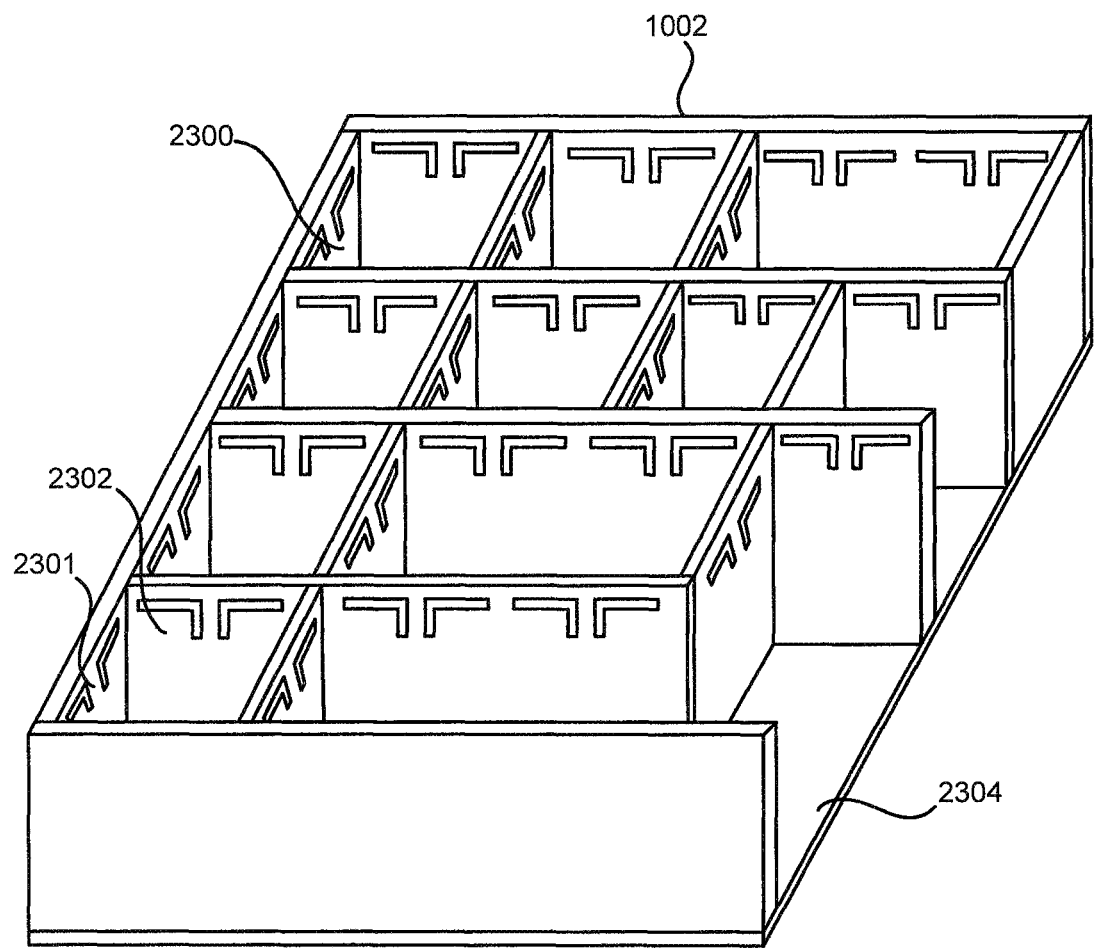
FIG. 19 is a diagrammatic perspective-view representation of a front face view a 4×4 receiver sub-array module where some of the receiving cells include dual perpendicular linear polarized dipoles.

FIG. 19 is a diagrammatic representation of a representative 4×4 receiver sub-array 1002 for a dual linear polarized receiver cells 2300 which for selected cells has an upright longitudinal rectenna cell 2301 and an upright transverse cell 2302 in a quasi egg-cart configuration. The dual linear polarization captures orthogonal portions of the incoming microwave radiation and improves the energy captured. The electronics of both polarizations are the same. The uprights are mounted to a backplane 2304. Not all cells are shown as some cells are removed for better pictorial representation.

Figure 20:
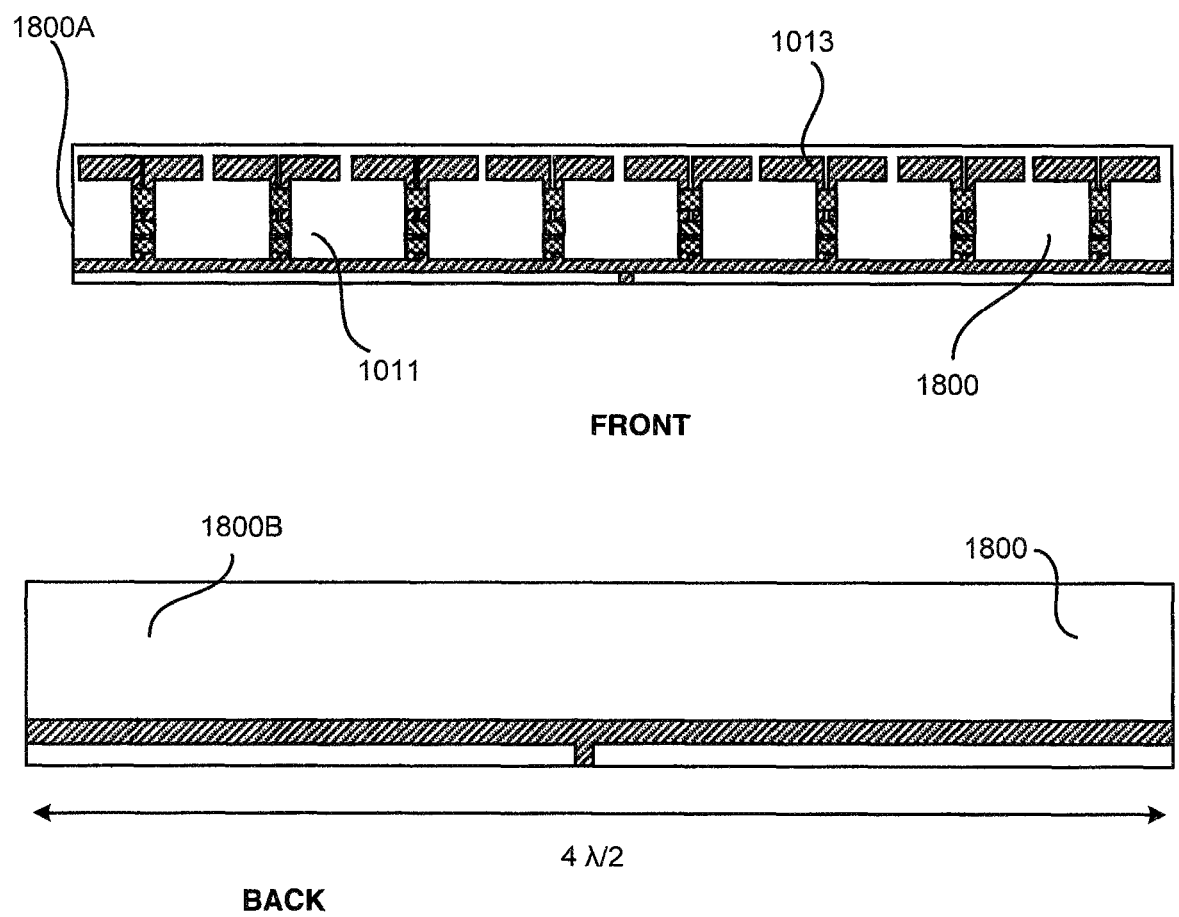
FIG. 20 is a diagrammatic representation of the front and back of a receiver sub-array of receiving cells oriented in 1 column of 8 in line receiving cells perpendicularly mounted to a partitioned single receiver array module according to one embodiment of the invention.

FIG. 20 is a representative representation of a single row configuration 1800A of 8 rectenna cells on a single upright 1800 showing the front face 1800A and the back face 1800B with a representative set of 8 electronic circuit 1013. The row 1801 is vertically mounted to a back plant (not shown).

Figure 21:
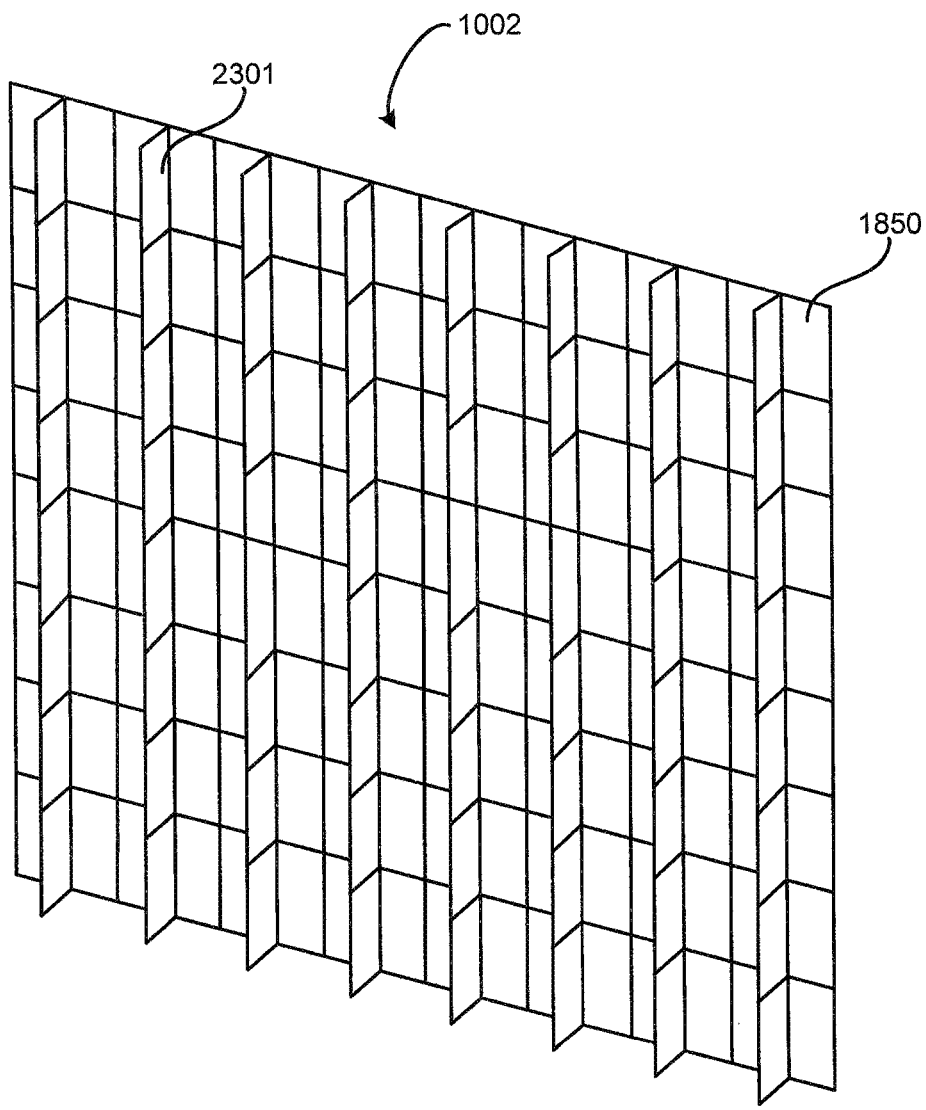
FIG. 21 is a diagrammatic representation of a receiver sub-array having an 8×8 array receiving cells.

FIG. 21 is a diagrammatic representation of a receiver sub-array 1002. The receiver sub-array 1002 is an 8×8 array of 64 single (vertical as shown) polarized receiver cells. The sets of 8 rectenna cells are mounted next to one another on a single row 2301 with 8 sets of 8 row receiver cells mounted to a back plane 1850. The receiver sub-array 1002 is mounted in a structure (not shown) and an array of receiver sub-arrays is assembled to form the rectenna antenna aperture 1000 of FIG. 9.

Figure 22:
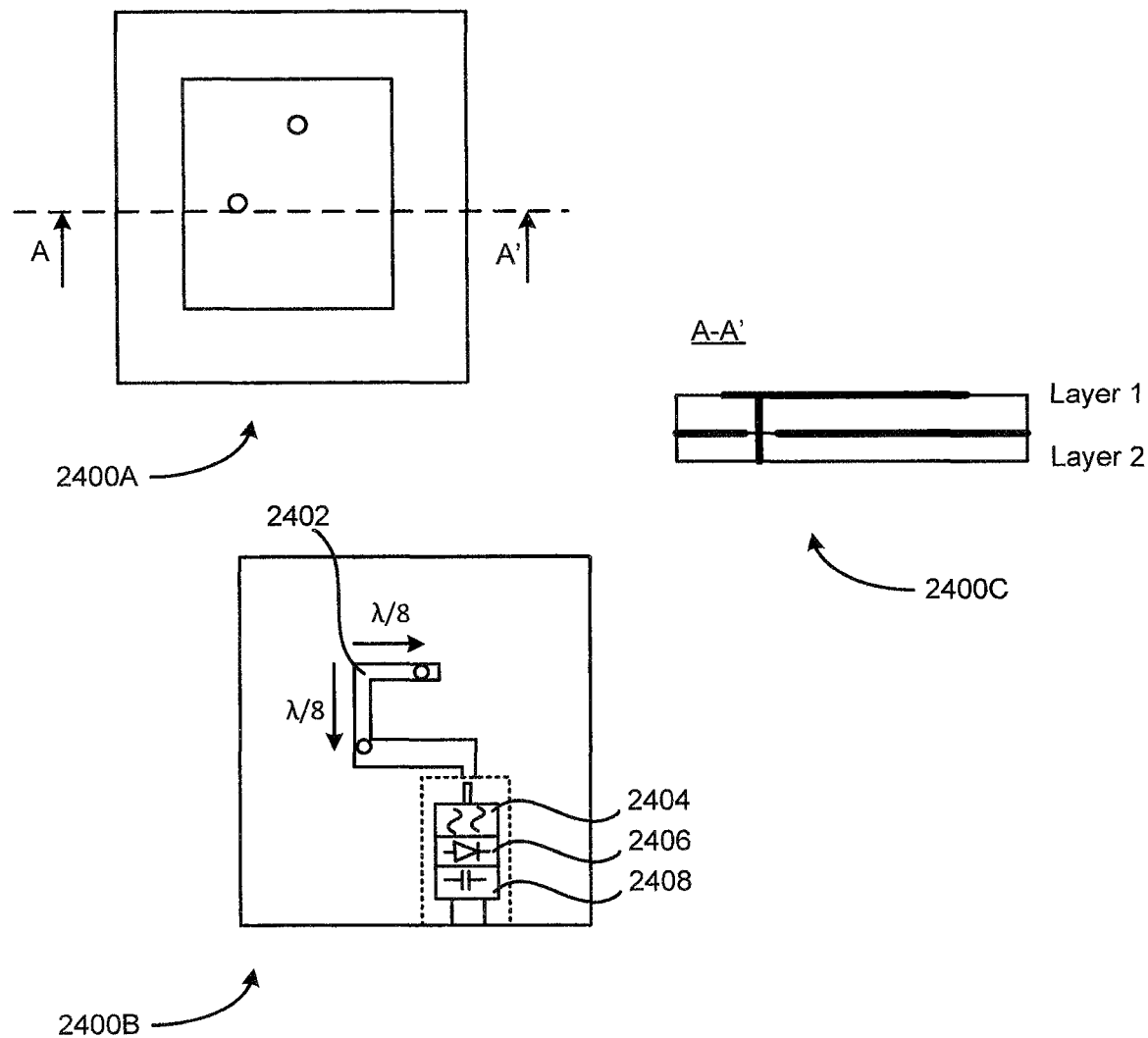
FIG. 22 is a diagrammatic representation of a single patch circuit receiving cell for showing a front view, back view and cross section according to one embodiment of the invention.

FIG. 22 is a diagrammatic representation of an alternative version of a receiver cell 2400A, B and C for CP microwave radiation. FIG. 22 includes a top view 2400A, a bottom view 2400B and a sectional view 2400C. The rectenna cell uses patch technology for 5.6 GHz CP circular polarized microwave radiation. This embodiment uses the same transmitter structure of a radiation exciter 2402, input matching circuit 2404, rectifier 2406, and low pass filter 2408. This embodiment also uses the same modular structure for receiver cells and receiver sub-array modules (not shown). The receiver cell includes printed circuit technology for high frequency microwave radiation including the "L" shaped printed signal trace of ⅛ the wave length and input filter matching circuit, rectifier circuit, and low pass filters. Identification of exact circuitry and component size for a given application is known those skilled in the art without undue experimentation.

Figure 23:
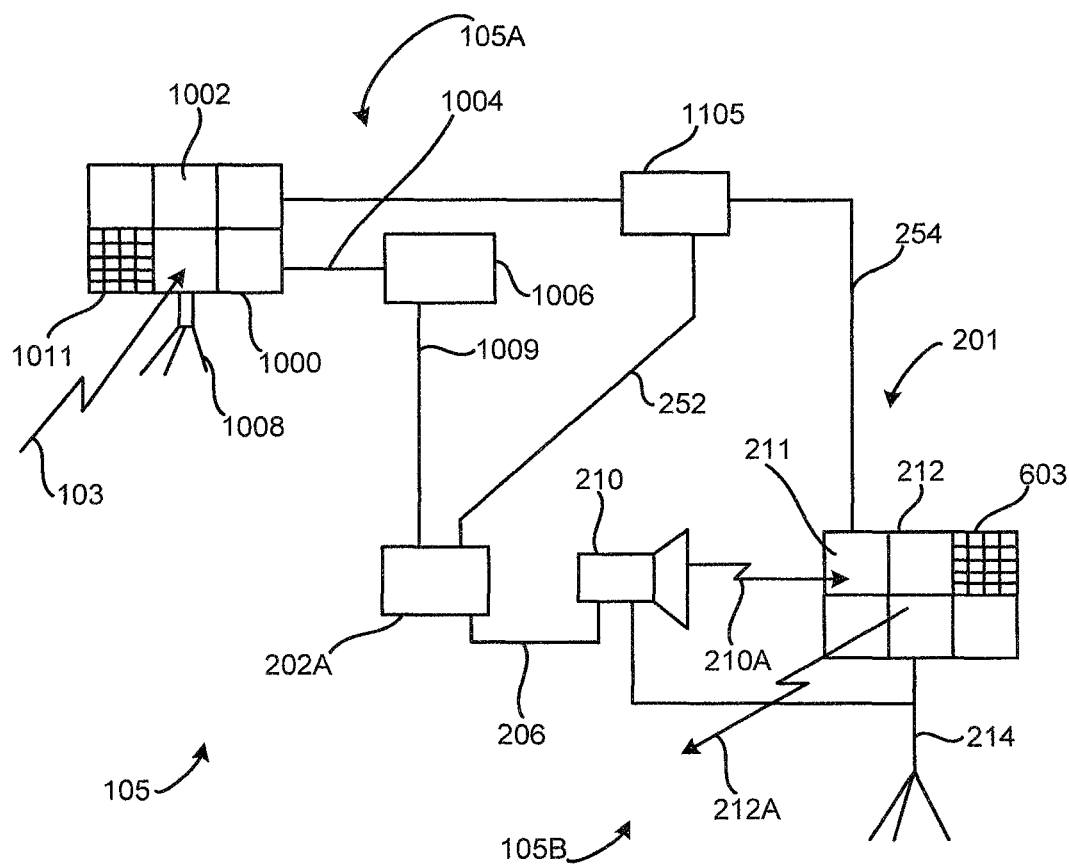
FIG. 23 is a diagrammatic representation of a relay redirector accordingly to one embodiment of the invention.

FIG. 23 is a diagrammatic representation of the relay redirector 105 of FIG. 1D according to an alternative embodiment of the invention. The redirector 105 includes a receive section 105A and a transmit section 105B. The receive section 105A includes a rectenna antenna aperture 1000 having receiver sub-array modules 1002 which each of which includes an array of receiver cell modules 1011. The receive section 105A also includes electricity collection control circuitry (not shown) and electrical power conditioner 1006 to produce output power 1009 similar in structure and operation as the receiver 105 FIG. 9. The transmit section 105B includes a source of electricity 1009, microwave converters 202A, and one or more reflectarray antenna, each including radiating horn 210 and reflectarray antenna aperture 212. The reflectarray antenna aperture 212, having transmit sub-array modules 211 each of which has rotatable reflector cell modules (now shown). The receiver section 105A also includes text demodulator 1105A, a electricity allocator, controller, and distributor. The demodulator, allocator, controller and distributor connects 252 to electricity to microwave converter 202A and to connects 254 to rectenna antenna aperture 212 whereby to modulate the data onto the power, to control the allocation of the electricity to the transmitters, controlling the orientation of the cell septum of each receiver cell 603 in accordance with the data received. The electronics of the demodulator, allocator, controller and distributor 1105 is known to those skilled in the art without undue experimentation.

Figure 24:
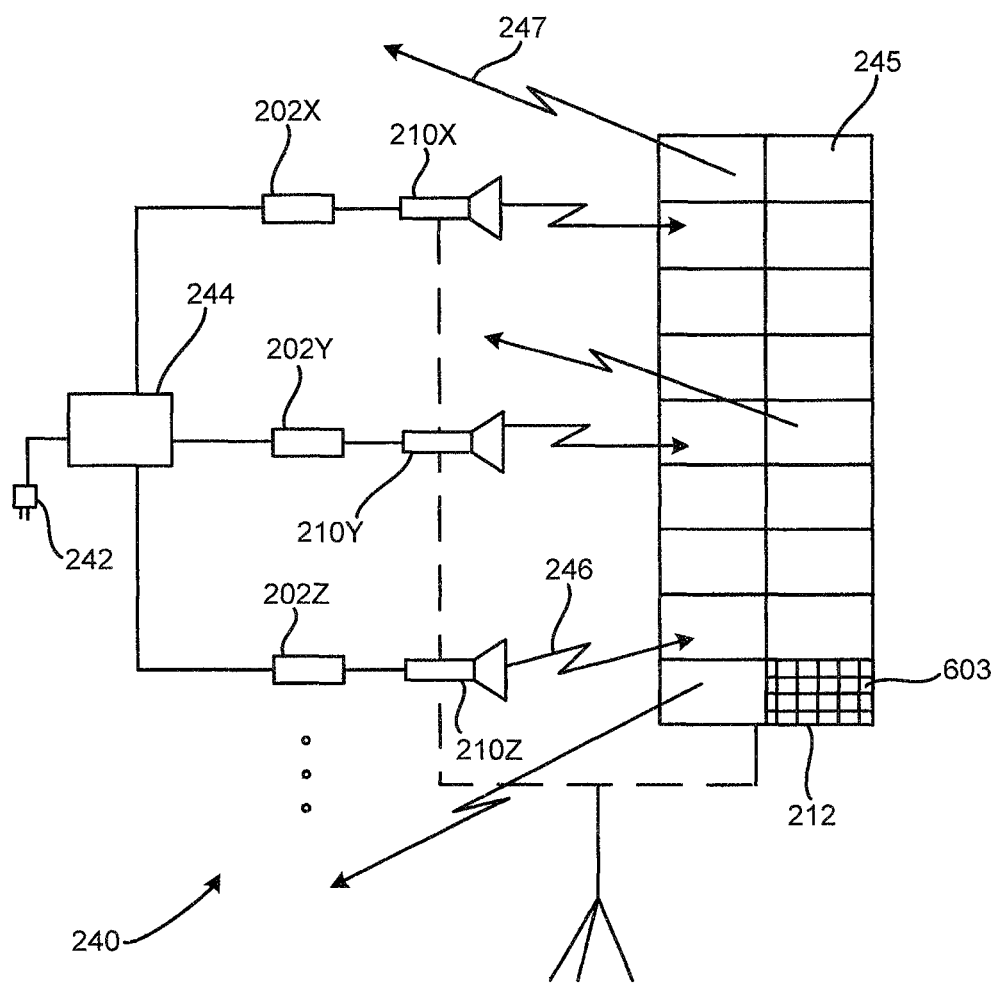
FIG. 24 is a diagrammatic representation of a multiple microwave beam transmitter according to one embodiment of the invention.

FIG. 24 is a diagrammatic representation of a multi-radiation beam transmitter 240 according to another embodiment of the invention. Like the transmitter system 102 of FIG. 2 the multi-beam transmitter 240 includes a power source, a power controller and distributor 244 and a plurality of electricity to microwave converters 204X, 204Y, and 204Z. Each converter is respectively connected to a dedicated radiating horn 210X, 210Y, and 210Z including respective waveguides and associated cones. Each horn is directed to illuminate a section of a transmitter aperture 212 having respective modular transmitter sub-array modules 245 which themselves have respective modular reflector cell arrays 603. In this embodiment source electricity is allocated to respective converter/transmitter sets. The amount of electricity is predetermined based upon the requirements of the respective destinations. Each horn transmits respective microwave radiation 246 to its associate reflectarray antenna aperture sections 245 of the reflectarray. The section 245 includes respective transmit sub-array modules 212 and associated reflector cells each cell with associated rotatable reflected septum (not shown) to direct the reflected microwave beam 247 to its assigned destination (not shown). Alternative structures for a multi-beam transmitter include a phased array antenna system, directed multiple transmit horns, and a single horn eliminating a reflect array aperture where dedicated sections of the of the transmit cells are directionally controlled with the power being proportional to the number of transit cells associated with each of the ultimate destinations. A still further alternative is to transmit a broad beam such that multiple receives are covered by the transmit beam. These alternative structures are considered within the scope of the invention. A general constraint of the transmitter is to maintain the beam density to a range of about 200 watts per square meter or lower (approximately 20 per square foot) for beams that may be adjacent populated areas. This beam density is generally accepted as suitable for indefinite human exposure. Particulars of these structures are known to those skilled in the art without undue experimentation.

Figure 25:
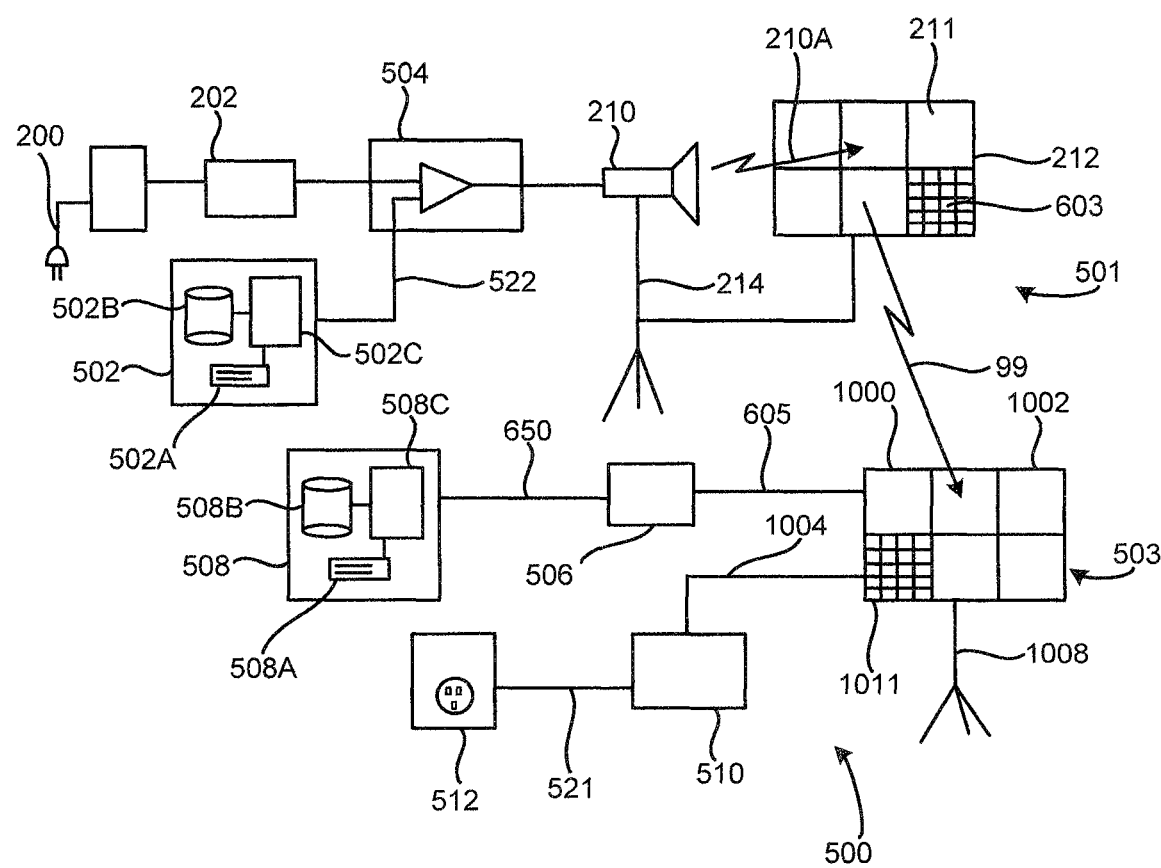
FIG. 25 is a diagrammatic representation of a data over power transmitter and receiver according to one embodiment of the invention.

FIG. 25 is a diagrammatic representation of a data over power transmitter/receiver system 500 according to another embodiment of the invention. The data over radiation system 500 begins with the basic transmitter 102 of FIG. 2 and receiver 104 of FIG. 9. The data over radiation system 500 includes a transmitter 501 having conventional power source 200, electricity to microwave signal converter 202, reflectarray antenna 209, including radiation horn 210, transmitter aperture 212, with sub-array transmitting modules 211, each of which has a modular array of reflector cells 603. The receive 503 includes of the data over radiation system 500 includes a receiver 503 having conventional rectenna antenna aperture with receive aperture 1000, including receiver sub-array modules 1002, each of which has a modular array of receiver cells 1011. The receiver system also includes power conditioner 510 and electrical outlet 512. The transmit system 501 transmits to the receiver system 503 electromagnetic radiation 99. The transmit system 501 also includes data generation system 502 including user interface 502A and data storage 502B with data interface 502C which connects with modulator 504. The modulator 504 modulates the microwave signal 521 with the data signal 522 by AM or FM or other modulation of the microwave signal 521 or alternatively a portion of the microwave signal is separately directed to a dedicated portion of the reflectarray antenna aperture 209 whereby the reflectarray antenna aperture 212 is illuminated by two separate EM frequency signals, one with data and one without data and where the reflectarray antenna 209 is a dual transmission, see FIG. 24. The reflected beam 99 would also have two components corresponding separately to the data and power radiations at the same time. In this alternative the data signal is connected directly to a dual transmission reflectarray antenna, one for data and one for power FIG. 24. The receiver 503 includes separator or demodulator 506 that receives the incoming microwave signal from of the cell electronics (not shown) whereby to separate the data portion of the signal from the power and. The alternative structure transfers, from a subset of the receiver cells, the data and power signal which is demodulated to determine the data.

The receive system 503 includes a rectenna antenna 1000 having conventional sub-receiving array modules 1002 and associated receiving cells 1011. The receiving cells include a frequency separator to direct the data frequency to the demodulator 506 and the power frequency to the power conditioner 510. The demodulator connects to data receive system 508 having user interface 508A, data storage 508B and data receiver 5080. The data may, for example, include instructions regarding the direction, range, power allocation of the ultimate destination.

Figure 26:
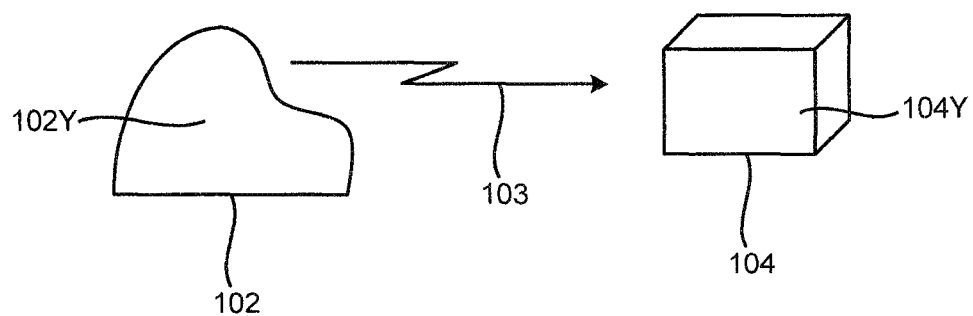
FIG. 26 is a representative image of the WEDS where the transmitter and the receiver each have an environmental protective cover.

FIG. 26 represents a transmit antenna cover 102Y and/or a receive antenna covers 104X using materials transparent to microwave radiation that are known to those skilled in the art to reduce environmental contaminants and to keep the active components clean. An important feature of the ability of the WEDS transmitter to direct and focus its microwave beam 103 with a reduced beam fringe that is radiation beyond the footprint of the receiver antenna. Beam fringe is lost as does not contribute to the energy captured by the receiver antenna. Reducing such beam fringe results in an effective increase of overall efficiency.

Figure 27A:
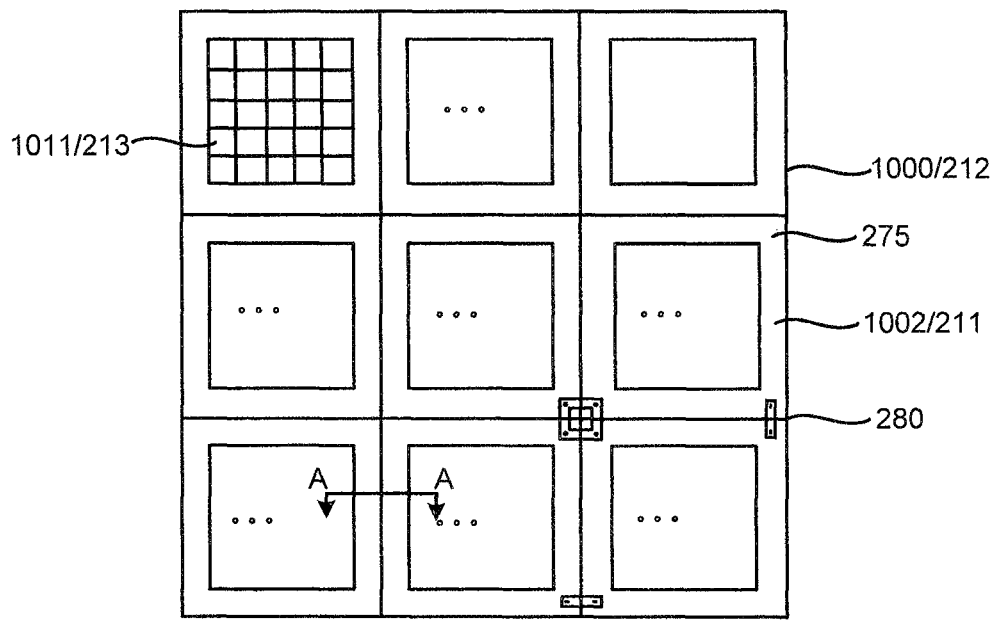
FIG. 27A is a representative image of a rectenna antenna aperture including modular interlocking receiver sub-array frames.
Figure 27B:
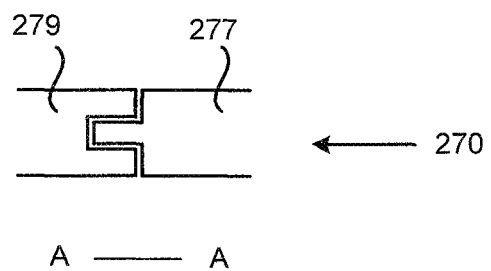
FIG. 27B is a representative image of Section A-A of FIG. 27A showing interlocked adjacent modules.

FIG. 27A is a representative image of reflectarray antenna aperture 212 or a rectenna antenna aperture 1000 with respective transmit sub-array modules 211 or receiver sub-array modules 1002 with respective rotatable cells 213 or receiver cells 1011. In this embodiment the respective sub-array modules 1002 or 213 include frames 275 that house the respective receiver cell modules 1002 or rotatable cell modules 213. The separate frames 275 are interlocking to form a stable array of modules. FIG. 27B structure 270 shows a representative interlocking system of tongues 277 and grove 279 structures in a checker board arrangement provide tongues 277 on two adjacent edges and groves 279 on the opposite edges. The tongue member and the grove member may be beveled to enable a snap locking connection. Many options of interlocking sections are known in the art but such structures has never been used for electrical WEDS systems. Additional locking straps 280 can be added to reinforce the interlocked frames. The interlocking modules permit the raid assembly and disassembly of the modules and permit the modules to be portable. The modules when dissembled form a stack of 9 modules and is really moved then reassembled for, for example, emergency instillations.

Reflecting septums are passive. They are optically coupled to the source of microwave energy. Septums with manual angular orientation are also passive. Septums with motor control require control wiring in the backplane in modular fashion. Such control is within the skill of the art.

Orientation Algorithm:

The orientation of each cell septum for circular polarized electromagnetic radiation is determined according to the physical structure of the of the reflect array antenna system, the distance between the transmitter and the receiver, the radiation frequency, and the angular orientation of each cell septum which orientation is determined by the following analysis. Initially care is required when undertaking this analysis due to the positive (+) or negative (−) notation of the wave propagation phases of waves in and out is referenced differently when using engineering or physic notation.

In general only transversal vector EM field propagates in space which has two vector components orthogonal to the direction of propagation and no component along the direction of wave propagation. Assuming the cartesian coordinate system the "z" direction of wave propagation a general with 2 transversal EM field components be defined:

$$\vec{E}(z, t) = \begin{bmatrix} e_x \\ e_y \\ 0 \end{bmatrix} e^{j(\omega t \mp kz + \varphi_0)}$$

Depends on magnitude and phase ratios between the transversal field components different types of polarized waves can be implemented.

Figure 28:
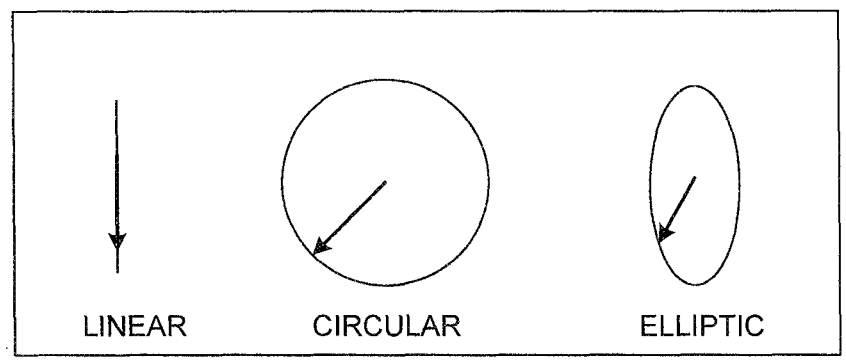
FIG. 28 is a representation of three types of polarized electromagnetic waves.

FIG. 28 shows for linear polarized waves only one of $e_x$ and $e_y$ is present or their combination with fixed phase relations between $e_x$ and $e_y$. For circular polarized waves (CP), the $e_x$ and $e_y$ components must have in-quadrature phase relation.

$$\vec{E}(z, t) = \begin{bmatrix} 1 \\ \pm j \\ 0 \end{bmatrix} e^{j(\omega t \mp kz + \varphi_0)}$$

Where the sign + denotes right-hand CP (RHCP) and the sign − stands for land-hand CP (LHCP). For simplification, the magnitudes of wave components are set to one.

The electric field vectors of a traveling circularly polarized electromagnetic wave is considered. This wave is right-circularly-polarized, since the direction of rotation of the vector is related by the right hand rule to the direction the wave is moving.

The real form of the CP wave can be easier interpreted using direct sin and cos math functions $$\vec{E}(z,t) = \begin{bmatrix} \cos(\omega t \mp kz + \varphi_0) \\ \pm\sin(\omega t \mp kz + \varphi_0) \\ 0 \end{bmatrix}$$

The complex exponent form is much easier for mathematical manipulations. A right-handed/clockwise circularly polarized wave is defined from the point of view of the source. It would be considered left-handed/anti-clockwise circularly polarized if defined from the point of view of the receiver. A left-handed anti-clockwise circularly polarized wave as defined from the point of view of the source. It would be considered right-handed/clockwise circularly polarized if defined from the point of view of the receiver.

If reflected by a metal plane the CP wave will change direction of propagation and switched between RHCP and LHCP if to use the new propagation reference.

Two spatial points along the direction of CP propagation will have a fixed phase shift defined by their spatial separation, viz. $\Delta d = d_2 - d_1$.

$$\vec{E}(z=d_1,t) = \begin{bmatrix} 1 \\ \pm j \\ 0 \end{bmatrix} e^{j(\omega t \mp kd_1 + \varphi_0)}$$

$$\vec{E}(z=d_2,t) = \begin{bmatrix} 1 \\ \pm j \\ 0 \end{bmatrix} e^{j(\omega t \mp kd_2 + \varphi_0)} = \vec{E}(z=d_1,t)e^{-jk\Delta d}$$

For simplification in reference to the septums, all second order effects are ignored by assuming:
1. Source radiation pattern is ignored.
2. Amplitude spherical spreading is ignored and assumed that magnitudes for $\vec{E}(z=d_1,t)$ and $\vec{E}(z=d_2,t)$ are the same.
3. It is assumed that incident wave is always normal to the ground plane where the septums are installed. A small parallax effect is ignored.

The incident CP wave expressions is rewritten with the superscript + to denote the incident CP wave travelled the distance d along the positive direction of the axis z:

$$\vec{E}(z,t) = \begin{bmatrix} 1 \\ \pm j \\ 0 \end{bmatrix} e^{j(\omega t - kd + \varphi_0)}$$

Figure 29A:
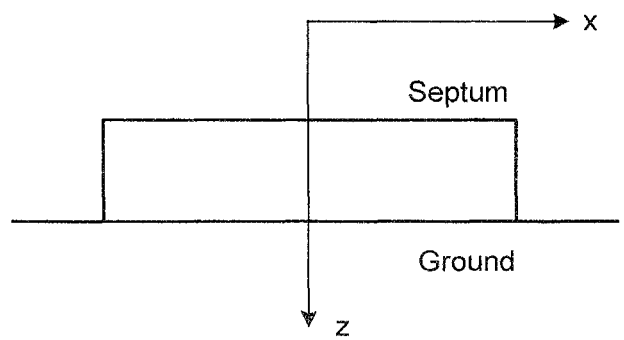
FIG. 29A is a side-view representation of a septum with ground plane phase shifter.
Figure 29B:
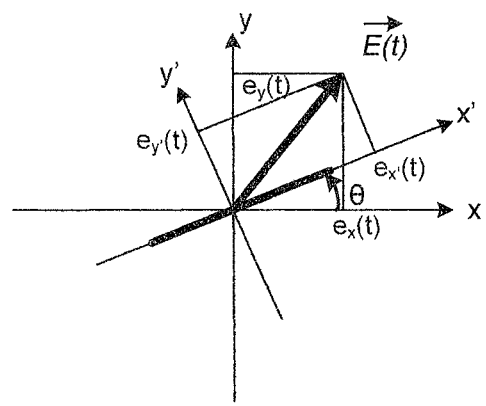
FIG. 29B is a representation of an incident CP electromagnetic wave on a septum.

There are two Cartesian coordinate systems (CS) in FIGS. 29A and 29B, viz. unprimed x, y, z CS and primed x', y', z' CS. The unprimed CS is global for the feed and all septums. The primed CSs are assigned locally for each individual septum as follows.

The x' axes of all local primed CS are aligned with their septums having an arbitrary rotation angle θ. They' axes of all local primed CS are orthogonal to the septums as it is shown for a single septum below. The z and z' axes coincide. As was already said, it is assumed that the CP wave always came along the z and z' axes. Any deviation of this condition will be a second-order effect which can be modeled using an enhanced model. This and similar second-order effects are not significant to develop and describe the phase control algorithm.

The phase changes due to scattering of the incident CP wave must be described. For this a single septum can be considered. More septums will be considered to formulate the beam control algorithm.

The rationale of the alignment for the primed CS is to deal with two distinctive reflection happens when the CP wave hits the septum. The x' axis is for the component of the CP wave which is parallel to the septum with wave reflection that happens at the septum top edge. They' axis is for the component of the CP wave which is normal (perpendicular) to the septum with reflection happen at the bottom of the septum where it is attached to the ground. This reflection requires additional $$\frac{\lambda}{4} + \frac{\lambda}{4} = \frac{\lambda}{2}$$

travel distance that introduces additional 180 ($\pi$) phase shift. To describe all these reflection mathematically transformation back and forth between the primed and unprimed CS must be employed as further described.

The E-field is rotated by the angular velocity ω and the image is just a snapshot taken at a moment of time t. The equation presented below were derived for such an arbitrary moment of time t and, thus, will stay valid for any moment of time, viz. arbitrary angle between the rotating vector and the reference axis x.

For the sake of simplification of the mathematical formal presentation we consider 2-D presentation of the CP wave with all phase terms omitted. This is done without any loss of generality and the phase term will be later restored.

$$\begin{bmatrix} 1 \\ \pm j \end{bmatrix}$$

The two dimensional rotation matrix describe transformation of points in the xy plane when rotated through an angle θ about the origin anti-clockwise $$R_1 = \begin{bmatrix} \cos\theta & -\sin\theta \\ \sin\theta & \cos\theta \end{bmatrix}$$

and clockwise $$R_2 = \begin{bmatrix} \cos\theta & \sin\theta \\ -\sin\theta & \cos\theta \end{bmatrix}$$

$R_1$ describes transformation from the unprimed CS to the primed CS and $R_2$ described backward from the primed CS to the prime CS. The reflection for the parallel and perpendicular CP field components can be described by the matrix with the elements on the main diagonal.

$$C = \begin{bmatrix} -1 & 0 \\ 0 & 1 \end{bmatrix}$$

The $C_{11}=-1$ term is for the parallel component aligned with the septum because of the boundary conditions, viz. reflection from the metal introduces 180 deg phase shift reflected by the sign −.

The $C_{22}=1$ term is for the perpendicular component normal to the septum because (1) of the boundary conditions similar to $C_{11}$ the 180 deg phase shift is introduced and (2) additional 180 deg phase shift is introduced because of the extra $$\frac{\lambda}{2}$$

travel and, thus $(-1)\times(-1)=1$.

Step 1: Coordinate transformation from the original unprimed to primed aligned with septum coordinates: Now we determine how the incident EM field x and y components will be changed when transformed from the unprimed CS to the primed CS.

$$R_1\begin{bmatrix}1\\\pm j\end{bmatrix}=\begin{bmatrix}\cos\theta & -\sin\theta\\\sin\theta & \cos\theta\end{bmatrix}\begin{bmatrix}1\\\pm j\end{bmatrix}=\begin{bmatrix}\cos\theta \mp j\sin\theta\\\sin\theta \pm j\cos\theta\end{bmatrix}=e^{\mp j\theta}\begin{bmatrix}1\\\pm j\end{bmatrix}$$

This transformation introduces the phase shift $\theta$.

Step 2: Reflection from septum and ground for parallel and orthogonal components: Next reflection is defined for the CP components aligned with the primed CS.

$$Ce^{\mp j\theta}\begin{bmatrix}1\\\pm j\end{bmatrix}=\begin{bmatrix}-1 & 0\\0 & 1\end{bmatrix}e^{\mp j\theta}\begin{bmatrix}1\\\pm j\end{bmatrix}=e^{\mp j\theta}\begin{bmatrix}-1\\\pm j\end{bmatrix}$$

That shows only sign changing for the x' component.

Step 3: Coordinate transformation from the primed to unprimed coordinates: Finally the reflected field is restored in the original unprimed CS.

$$R_2 e^{\mp j\theta}\begin{bmatrix}1\\\pm j\end{bmatrix}=\begin{bmatrix}\cos\theta & \sin\theta\\-\sin\theta & \cos\theta\end{bmatrix}e^{\mp j\theta}\begin{bmatrix}1\\\pm j\end{bmatrix}$$
$$=e^{\mp j\theta}\begin{bmatrix}-\cos\theta \pm j\sin\theta\\\sin\theta \pm j\cos\theta\end{bmatrix}$$
$$=e^{\mp j2\theta}\begin{bmatrix}1\\\pm j\end{bmatrix}$$

The septum introduces $2\theta$ phase shift to the reflected CP way. Note that the direction of the wave propagations is changed to opposite. Because CP is always referred to the direction of propagation that will mean that it could be changed from RHCP to LHCP and vice versa if to use the new switched direction of propagation.

Figure 30:
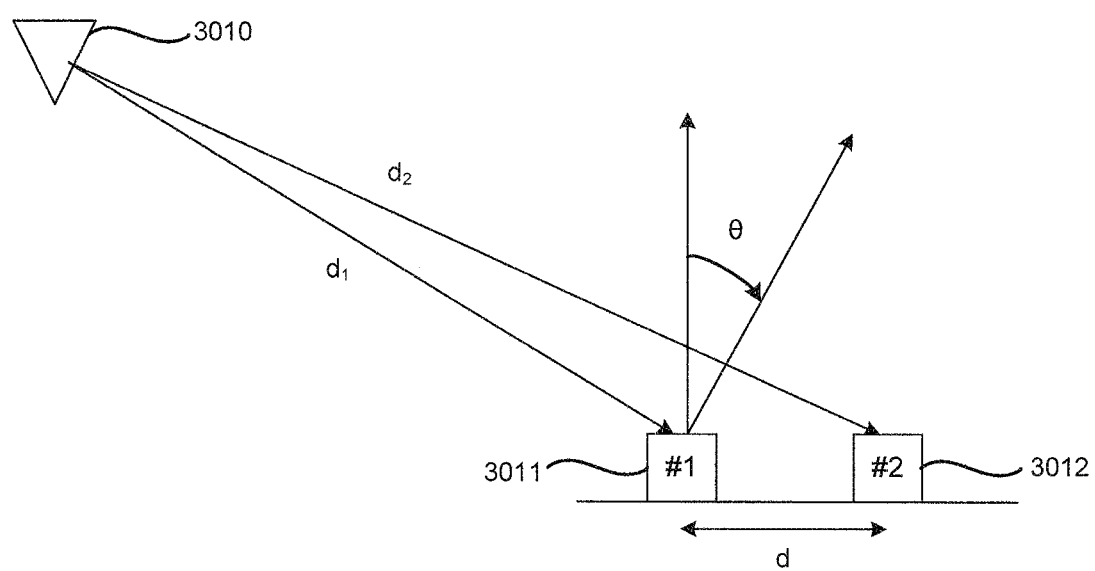
FIG. 30 is a side-view representation of a feed horn illuminating representative reflector septums.

Let's consider two spatially separated septums which are different by their distance from the illumination source, see FIG. 30. FIG. 30 shows feed horn 3010 and two cell septums, 3011 and 3012 with two incident EM fields.

$$\vec{E_1}=\vec{E}(d_1,t)=\begin{bmatrix}1\\\pm j\\0\end{bmatrix}=e^{j(\omega t-kd_1+\varphi_0)}$$

$$\vec{E_2}=\vec{E}(d_2,t)=\begin{bmatrix}1\\\pm j\\0\end{bmatrix}=e^{j(\omega t-kd_2+\varphi_0)}$$

After hitting two septums positioned at $z=d_1$ and $z=d_2$ with their orientations angles $\theta_1$ and $\theta_2$, respectively, two reflected CP waves are formed:

$$\vec{E_1}=\vec{E}(d_1,t)=\begin{bmatrix}1\\\pm j\\0\end{bmatrix}=e^{j(\omega t-kd_1+\varphi_0\pm 2\varphi_1)}=\begin{bmatrix}1\\\pm j\\0\end{bmatrix}e^{j\varphi_1(t)}$$

$$\vec{E_2}=\vec{E}(d_2,t)=\begin{bmatrix}1\\\pm j\\0\end{bmatrix}=e^{j(\omega t-kd_2+\varphi_0\pm 2\varphi_2)}=\begin{bmatrix}1\\\pm j\\0\end{bmatrix}e^{j\varphi_2(t)}$$

The phase factors introduced above are $$\theta_{1,2}(t)=\omega t-kd_{1,2}+\varphi_0\mp 2\theta_{1,2}$$

The phase difference between these two CP waves is defined $$\varphi_{1,2}=\varphi_2(t)-\varphi_1(t)=-k(d_2-d_1\pm 2(\theta_2-\theta_1)$$

Note that the phase difference for any pair of two septums is defined by their spatial positions, viz. $d_1$ and $d_2$, and the orientations of their septums $\theta_1$ and $\theta_2$ and is time independent.

Assume that the reflected CP wave needs to be spatially combined to provide maximum of their radiation (constructive interference or beamforming) towards an arbitrary direction $\Theta$ that requires providing mutual phase difference $$\varphi_{1,2}(\Theta)=k(d_1-d_2)\sin\Theta$$

Equating:

$$\varphi_{1,2}=\varphi_{1,2}(\Theta)$$

Allows to define mutual positioning of two septums to achieve the required beam pointing:

$$\pm(\theta_2-\theta_1)=\frac{k(d_1-d_2)}{2}(\sin\Theta-1)$$

Figure 31:
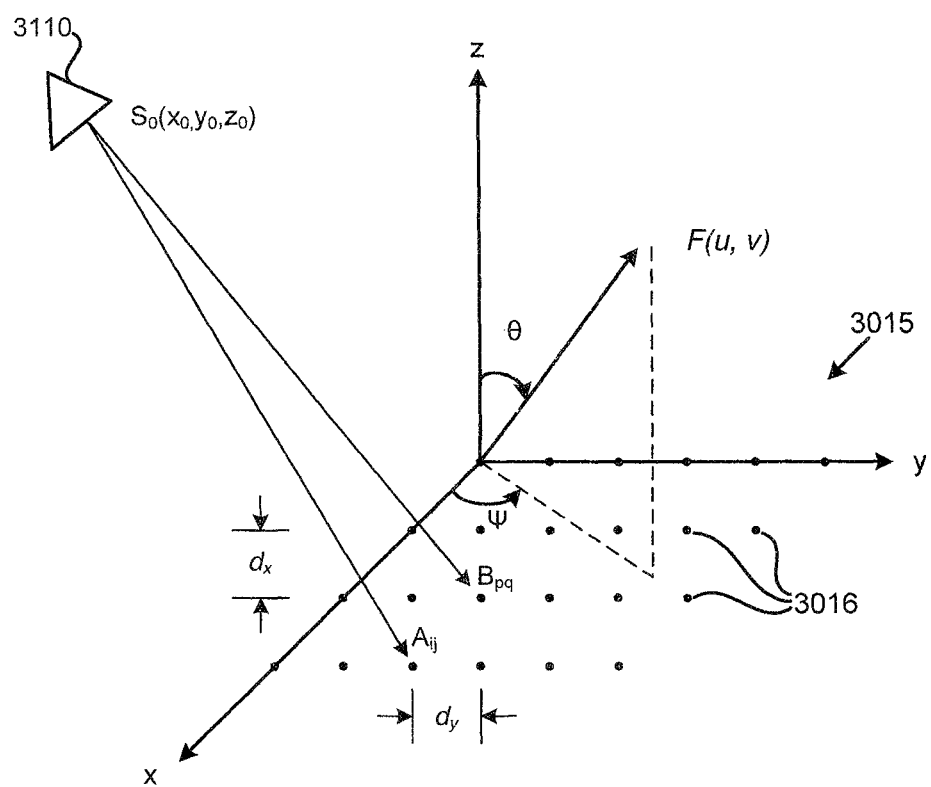
FIG. 31 is a perspective-view representation of a feed horn illuminating an array of representative septums.

A generic 2-D reflect aperture is presented in FIG. 31 with the feed horn 3110 positioned at $S_0(x_0, y_0, z_0)$ referred as its phase center.

The array aperture is in the xy plane at $z=0$. For this example, the rectangular array grid 3015 with $d_x$ and $d_x$ stepping. The septum centers 3016 are marked by dots.

For each element, there is a path from the horn source as exemplified for two elements:

$$A_{ij}=(id_x, jd_y, 0), i,j=0,1,2,3,\ldots$$

$$B_{pq}=(pd_x, qd_y, 0), p,q=0,1,2,3,\ldots$$

Beam steering towards a given direction $(\Theta,\Psi)$ requires forming the phase distribution over the aperture:

$$P_{i,j}=kd_x i\sin\Theta\cos\Psi+kd_y j\sin\Theta\sin\Psi$$

which will be formed by setting properly septum rotation angle.

Assume the element at the position $(x,y)=d_x i, d_y j)=(d_x 0, d_y 0)=(0,0)$ for I=0, j=0 is selected as phase reference. For this element its distance to the source is:

$$d_{0,0}=\sqrt{x_0^2+y_0^2+z_0^2}$$

and its septum is rotated to be aligned with x axis ($\theta=0$). Then all other septums $i\neq 0$, $j\neq 0$ positioned arbitrary across the rotation angles must be set:

$$\pm\theta_{i,j} = \frac{k}{2}(kd_x i\sin\Theta\cos\Psi + kd_y j\sin\Theta\sin\Psi - (d_{i,j} - d_{0,0}))$$

Where:

$$d_{i,j} = \sqrt{(x_0 - d_x i)^2 + (y_0 - d_y j)^2 + z_0^2}$$

The basic configuration of the WEDS includes a specific architecture of a reflectarray antenna transmitter with radiating horn and a transmit aperture having transmit sub-array modules each of which has a array of reflector cells that transmit a circular polarized or dual linear polarized electromagnetic radiation to a rectenna antenna with an antenna aperture. The density of the power of the microwave transmission is maintained in the range of about 20 watts per square foot or up to about 200 watts per square meter for beams that may interface with humans. The power of all the sun's radiation on the earth's surface at noon is about 1000 watts per square meter. Lower densities are acceptable. If the beam is directed to non-habited areas or locations and where the EM radiation does not interfere with other EM systems, such as to a satellite or weathered balloon, much higher densities are acceptable. In circumstances where the size of the antenna apertures gets large due to high power requirements and moderate density limitations multiple transmitters can be implemented to keep size and weight reasonable while keeping power densities reasonable. Some applications of WEDS are appropriate for a transmitter that provides a simple narrow beam radiating horn or horn with EM reflector. Some applications of WEDS are appropriate for a receiver of a microwave beam by a conventional antenna including a receiver horn or a beam reflector and receiving horn.

The architecture if WEDS is operational over a wide range of distances and powers. Use of a reflectarray antenna transmitter enables directivity and focus capabilities and having a modular components enable large scaling options. Use of a rectenna receiver provides modular components with large scaling options. Electronic modularity enables cost effective manufacture. Structural modularity offers great flexibility for locating transmitter and receiver sites and provides rapid assembly and transportability. Using a redirector relay extends the reach of the transmitter receiver set. The multiple transmitter enables a single location to simultaneously reach multiple destinations. Applying a data channel over the power beam provides wide flexibility for management of the electrical distribution system. Even though various components of WEDS are known and even used in other applications no electricity transmit receive system, for moving electricity has been conceived. WEDS is particularly suited short range low power use for back yard, remote buildings power options and large industrial building electrical distribution capabilities. Intermediate range and medium power opens up opportunities to send electricity to near islands, mountaintops, indefinite aerial station keeping and power relay vehicles, and many silent military power transfer applications. Long range and high power enables the transfer of commercial quantities of electricity for local space transportation vehicles and for reaching communities without existing energy sources enabling massive improvement of their life's condition. No system has ever assembled such a flexible and useable sets of structural devices to meet the needs of electricity distribution. Specific component values and specific circuitry for selected range and power applications are known to those skilled in the art without undue experimentations now that the architecture of the WEDS is known. In addition WEDS avoids if not eliminates the problems of the prior art transmission lines by avoiding equipment and space requirement, by avoiding exposure to physical threats, by avoiding the obligation for licenses and rights of way, and by enabling immediate emergency electricity availability. Further WEDS avoids the complications of conventional wireless power transmission by having multiple microwave beam transmission capability and not limited to one destination for each transmitter, by having active relay redirectors with a receiver and re-transmitter, to extend the transmission distance while managing aperture size of transmitter and receiver antenna, by structural modularity and by providing data over power communication.

What is claimed is:

1. A wireless electricity distribution system comprising:
a transmitter for transmitting a microwave radiation power beam; and
a receiver for receiving the microwave radiation power beam;
the transmitter for transmitting the microwave radiation power beam comprising:
a source of electricity having a power controller for providing a controlled amount of electricity connected to;
a converter for converting the controlled amount of electricity into a microwave signal having an amount of microwave power responsive to the controlled amount of electricity at a preselected frequency connected to;
a reflectarray antenna comprising;
a microwave radiating horn and a reflectarray antenna aperture that receives the microwave signal and radiates microwave radiation;
the radiating horn having a waveguide section and a cone section, the waveguide section having a close end, an open end, an internal stepped septum and a radiating stub and the cone section having a open end connected to the open end of the waveguide section and a larger open end, the stub connected to the microwave signal, the horn emitting the microwave radiation; and
a reflectarray antenna aperture positioned to receive the microwave radiation from the horn whereby to reflect a microwave radiation power beam toward a predetermined destination, the reflectarray antenna aperture comprising;
one or more transmit sub-arrays with each transmit sub-array comprising an array of individual reflector cells, each reflector cell having a perpendicular cell septum mounted to a back plane, the top of the cell septum being metallic and being approximately ¼ wavelength of the frequency off the base and the length of the cell septum being approximate ½ wavelength, each of the cell septum being independently rotated to a predetermined orientation whereby to direct and focus the microwave radiation power beam to the destination;
the radiating horn being fixedly mounted relative to the reflectarray antenna aperture with the reflectarray antenna aperture being directably mounted on a stand;
the receiver located at the destination comprising:
a rectenna antenna aperture for receiving the microwave radiation power beam comprising;

one or more receiver sub-arrays with each receiver sub-array comprising an array of individual receiver cells;
each receiver cell comprising;
cell electronics including;
a radiation capturer responsive to the microwave radiation power beam,
matching circuit connected to the radiation exciter,
microwave radiation to an electricity rectifier connected to the matching circuit, and
a low pass filter connected to the rectifier providing cell electricity;
the cell electronics being mounted on a cell plane approximately ½ wavelength square, the array of cells being perpendicularly mounted to a back plan in rows and columns;
each cell producing cell electricity, the cell electricity from each cell having connectivity to produce sub-array electricity, the sub-array electricity having connectivity to produce receiver aperture electricity, the array of receiver cells mounted within each receiver sub-array and the array of receiver sub-array mounted within the rectenna antenna aperture;
a power conditioner connected to the receiver aperture electricity to provide electricity responsive to the user requirements.

2. The wireless electricity distribution system of claim 1 further comprising;
a relay redirector intermediate the transmitter and the receiver comprising a redirector receiver and a redirector transmitter:
the redirector receiver for receiving the microwave radiation power beam from the transmitter, the redirector receiver comprising a receiver;
the redirector transmitter for transmitting an independent relay microwave radiation power beam to the receiver;
the redirectors transmitter comprising a transmitter;
a redirector receiver further including a controller-distributor having electricity distribution connectivity for connecting the received electricity to the power converter-controller of the redirector transmitter, whereby the relay redirector receives microwave radiation power beam from the transmitter converting it into received electricity, distributing the received electricity to the redirector transmitter as source electricity for conversion into microwaves for transmission to the receiver at the ultimate destination.

3. The wireless electricity distribution system of claim 1 wherein:
the transmitter further includes:
a plurality of radiating horns, each horn having an associated a converter of electricity to microwave signals and
each radiation horn directed to illuminate a respective sub-section of the reflectarray aperture with the cell septum of each reflector cell within the respective sub-section being oriented to direct and focus the microwave radiation illuminating the respective cell septum to produce respective microwave radiation power beams corresponding to respective destinations; and
a distributor within the source of electricity to distribute, respectively, to each converters the amount to electricity corresponding to the requirements of the respective destination; and
wherein the system further includes additional receivers to have a receiver for each destination.

4. The wireless electricity distribution system of claim 1 wherein;
the reflect array aperture includes a plurality of sub-sections each sub section having respective reflector cells of transmit sub-arrays with the cell septum of each reflector cell being independently oriented to direct and focus the microwave radiation illumination such cell septum to the destination responsive the orientation of cell septum within such sub-section.

5. The wireless electricity distribution system of claim 1 wherein;
the transmitter further includes:
a data generator having a transmit user interface, a transmit data storage, and a transmit control interface,
a data over microwave signal modulator,
the data is transmitted to transmit control interface from the transmit data storage to the signal modulator whereby to modulate the data with the microwave signal for transmission by the transmitter to the receiver;
the receiver further includes:
a data receiver having a receiver user interface, a receiver data storage and a receiver interface;
a demodulator for separating the data from the microwave power beam,
the demodulator is connected to one or more radiation exciter where by the data is separated from the microwave power beam and connected to the receiver interface where it is stored in receive data storage device.

6. The wireless electricity distribution system of claim 3 wherein;
the transmitter includes a second frequency signal,
the input to one of the radiation horns of the transmitter is data from a transmit data storage that is modulated onto a second frequency signal for transmission of a second radiation by the one radiation horn of the transmitter to the receiver and
the second radiation received by one or more radiation exciters is demodulated into the data and the data being stored in a received data storage device.

7. The wireless electricity distribution system of claim 1 wherein: the radiation capturer is a dipole.

8. The wireless electricity distribution system of claim 1 wherein: frequency of the 2.46 GHz.

9. The wireless electricity distribution system of claim 1 wherein: the rectifier is a series rectifier.

10. The wireless electricity distribution system of claim 1 wherein: the transmit sub-array module are mounted in a transmit frame that removably interconnect with the transmit frame of adjacent sub-array modules to form the reflectarray antenna aperture.

11. The wireless electricity distribution system of claim 1 wherein: the receiver sub-array modules are mounted in a modular receiver frame that removably connect to the receiver frame of adjacent modular receiver frames to form the rectenna antenna aperture.

12. The wireless electricity distribution system of claim 1 wherein: the reflectarray antenna is a directable narrow beam radiating horn.

13. The wireless electricity distribution system of claim 1 wherein: radiating horn having a narrow parabolic reflector.

14. The wireless electricity distribution system of claim 1 wherein: the rectenna antenna aperture is a narrow beam receiving horn.

15. The wireless electricity distribution system of claim 1 wherein: the narrow beam receiving horn includes a parabolic reflector.

16. The wireless electricity distribution system of claim 1 wherein one or more septum is manually rotated to a fixed angular position responsive to the orientation algorithm taking into considerations the frequency of the microwave radiation, the size of the transmitter aperture, the size of the receiver aperture, the distance between the transmitter and the receiver and the direction to the receiver from the transmitter.

17. The wireless electricity distribution system of claim 1 wherein one or more septum is rotated automatically to an angular position, the septum is mounted to a rotating motor, the angular rotation of the motor is responsive to a rotation signal provided by a orientation controller that is responsive to the orientation algorithm taking into considerations the frequency of the microwave radiation, the size of the transmitter aperture, the size of the receiver aperture, the distance between the transmitter and the receiver and the direction to the receiver from the transmitter.

* * * * *